(12) United States Patent
Bookbinder et al.

(10) Patent No.: US 7,635,658 B2
(45) Date of Patent: Dec. 22, 2009

(54) DEUTEROXYL-DOPED SILICA GLASS, OPTICAL MEMBER AND LITHOGRAPHIC SYSTEM COMPRISING SAME AND METHOD OF MAKING SAME

(76) Inventors: Dana Craig Bookbinder, 2675 Davis Rd., Corning, NY (US) 14830; Richard Michael Fiacco, 83 E. Fourth St., Corning, NY (US) 14830; Ulrich Wilhelm Heinz Neukirch, 9 E. Chatfield Pl., Painted Post, NY (US) 14870

( * ) Notice: Subject to any disclaimer, the term of this patent is extended or adjusted under 35 U.S.C. 154(b) by 362 days.

(21) Appl. No.: 11/583,619

(22) Filed: Oct. 19, 2006

(65) Prior Publication Data

US 2007/0105704 A1    May 10, 2007

Related U.S. Application Data

(63) Continuation-in-part of application No. 11/348,956, filed on Feb. 6, 2006.

(60) Provisional application No. 60/734,527, filed on Nov. 7, 2005.

(51) Int. Cl.
| | |
|---|---|
| C03C 3/06 | (2006.01) |
| C03C 15/00 | (2006.01) |
| C03B 19/06 | (2006.01) |
| C03B 37/00 | (2006.01) |
| C03B 37/014 | (2006.01) |

(52) U.S. Cl. .................. 501/54; 65/17.4; 65/30.1; 65/32.5; 65/157

(58) Field of Classification Search ............ 501/54; 65/17.4, 59.23, 157, 32.5, 30.1, 30.12
See application file for complete search history.

(56) References Cited

U.S. PATENT DOCUMENTS

| | | | | |
|---|---|---|---|---|
| 4,445,918 | A * | 5/1984 | Modone et al. | 65/379 |
| 4,515,612 | A * | 5/1985 | Burrus et al. | 65/426 |
| 5,325,230 | A | 6/1994 | Yamagata et al. | 359/350 |
| 5,395,413 | A | 3/1995 | Sempolinski et al. | 65/414 |
| 6,174,509 | B1 | 1/2001 | Pavlik et al. | 423/337 |
| 6,220,059 | B1 * | 4/2001 | Klein et al. | 65/394 |
| 6,477,305 | B1 | 11/2002 | Berkey et al. | 385/123 |
| 6,576,578 | B1 * | 6/2003 | Ikuta et al. | 501/54 |
| 6,619,073 | B2 * | 9/2003 | Borrelli et al. | 65/30.1 |

(Continued)

OTHER PUBLICATIONS

Owa et al. Immersion lithography; its potential performance and issues. Optical Microlithography XVI, Anthony Yen, Editor, Proceedings of SPIE vol. 5040 (2003).*

(Continued)

*Primary Examiner*—Karl E Group
*Assistant Examiner*—Noah S Wiese
(74) *Attorney, Agent, or Firm*—Robert P. Santandrea; Siwen Chen

(57) ABSTRACT

What is disclosed includes OD-doped synthetic silica glass capable of being used in optical elements for use in lithography below about 300 nm. OD-doped synthetic silica glass was found to have significantly lower polarization-induced birefringence value than non-OD-doped silica glass with comparable concentration of OH. Also disclosed are processes for making OD-doped synthetic silica glasses, optical member comprising such glasses, and lithographic systems comprising such optical member. The glass is particularly suitable for immersion lithographic systems due to the exceptionally low polarization-induced birefringence values at about 193 nm.

130 Claims, 16 Drawing Sheets

U.S. PATENT DOCUMENTS

| | | | |
|---|---|---|---|
| 6,698,248 B2 | 3/2004 | Marley et al. | 65/413 |
| 6,885,787 B2 | 4/2005 | Antos et al. | 385/15 |
| 6,904,772 B2 | 6/2005 | Berkey et al. | 65/412 |
| 6,944,382 B2 | 9/2005 | Berkey et al. | 385/123 |
| 7,076,141 B2 | 7/2006 | Berkey et al. | 385/123 |
| 2001/0047665 A1 | 12/2001 | Zhang et al. | 65/17.2 |
| 2002/0094180 A1 | 7/2002 | Antos et al. | 385/123 |
| 2002/0102083 A1 | 8/2002 | Berkey et al. | 385/123 |
| 2004/0060327 A1 | 4/2004 | Berkey et al. | 65/422 |
| 2005/0063663 A1 | 3/2005 | Anderson et al. | 385/142 |
| 2005/0163443 A1 | 7/2005 | Antos et al. | 385/123 |
| 2005/0191019 A1 | 9/2005 | Berkey et al. | 385/123 |
| 2006/0137398 A1 | 6/2006 | Bleaking et al. | 65/17.3 |

OTHER PUBLICATIONS

Modification of vacuum-ultraviolet absorption of SiOH groups in SiO2 glass with temperature, F2 laswer irradiaiton, and H-D isotope exhange pp. 2307-2310 (2006) Journal of Non-Crystalline Solids vol. 352.

D.L. Fry, P.V. Mohan, and R.W. Lee, "Hydrogen-Deuterium Exchange in Fused Silica" Journal of the Optical Soc. Of America, vol. 50, No. 12, pp. 1321-1322, Dec. 1960.

James E. Shelby, "Quantitative Determination of the Deuteroxyl Content of Vitreous Silica" Communication of the Am. Ceramic Society, vol. 70, No. 1, pp. C-9, C-10, Jan. 1987.

J. E. Shelby, P.L. Mattern, and D. K. Ottesen, "Radiation-induced isotope exchange in vitreous silica" J. Appl. Phys., vol. 50, No. 8, pp. 5533-5535, Aug. 1979.

J. E. Shelby, "Molecular diffusion and solubility of hydrogen isotopes in vitreous silica" Journal of Applied Physics, vol. 48, No. 8, pp. 3387-3394, Aug. 1977.

Optical Absorption of the Transition Elements in Vitreous Silica, Peter Shultz, American Ceramic Society, Oct. 25, 2973, pp. 309-313, vol. 57, No. 7, 1973.

Quantitative infrared spectroscopic measurement of hydroxyl concentrations in silica glass, K.M. Davis, A. Agarwal, M. Tomozawa, K. Hirao, Journal of Non-Crystalline Solids 203(1996) 27-36.

Preparation of D2O-treated sol-gel silica preform and OD absorption bands at IR and near-IR region, K. Susa, I. Matsuyama and S. Satoh, Journal of Non-Crystalline Solids 146 (1992) 81-89.

Comparison if 80-keV D+ Ion Implantation with Thermal D2 Doping in Silica by FTIR and ESR Spectroscopy, Masakatsu Saeki, Shin-Ichi Ohno, and Enzo Tachikawa, J. Am. Ceram. Soc., 68 (3) 151-155 (1985).

Stimulated Vibrational Raman Scattering in HD, Hiroshi Komine et al., IEEE Journal of Quantum Electronics, vol. QE-22, No. 4, Apr. 1986, p. 520-521.

Colossal kinetic isotope effects on proton-coupled electron transfer, My Hang, V. Huynh, and Thomas J. Meyers, p. 13138-13141, PNAs, Sep. 7, 2004, vol. 101, No. 36.

* cited by examiner (F1)  (F2)

(F3)

(F4)

DEUTEROXYL-DOPED SILICA GLASS, OPTICAL MEMBER AND LITHOGRAPHIC SYSTEM COMPRISING SAME AND METHOD OF MAKING SAME

CROSS-REFERENCE TO RELATED APPLICATIONS

The present invention is a continuation-in-part application of U.S. patent application Ser. No. 11/348,956, entitled "DEUTEROXYL-DOPED SILICA GLASS, OPTICAL MEMBER AND LITHOGRAPHIC SYSTEM COMPRISING SAME AND METHOD OF MAKING SAME," filed on Feb. 6, 2006, which, in turn, claims the benefit of the earlier filing date of U.S. Provisional Patent Application Ser. No. 60/734,527, entitled "DEUTEROXYL-DOPED SILICA GLASS, OPTICAL MEMBER AND LITHOGRAPHIC SYSTEM COMPRISING SAME AND METHOD OF MAKING SAME," filed on Nov. 7, 2005, the content of both of which are relied upon and hereby incorporated by reference in their entirety.

FIELD OF THE INVENTION

The present invention relates to synthetic silica glass materials, optical elements and devices comprising the same and method of making the same. In particular, the present invention relates to synthetic silica glass material capable of being used in the optical elements in lithographic devices operating at a wavelength below about 300 nm, optical elements comprising the same, lithographic systems comprising such optical elements, process for making such glass material, and soot preform produced in such process. The present invention is useful, for example, in making synthetic fused silica glass materials for optical elements used in deep UV and vacuum UV lithographic devices, especially those involving immersion lithography in which linearly polarized UV light is employed.

BACKGROUND OF THE INVENTION

As practiced commercially, fused silica optical members such as lenses, prisms, filters, photomasks, reflectors, etalon plates and windows, have been manufactured from bulk pieces of fused silica made in large production furnaces. Bulk pieces of fused silica manufactured in large production furnaces are known in the art as preforms, boules or ingots. Blanks are cut from boules or ingots, and finished optical members are manufactured from glass blanks, utilizing manufacturing steps that may include, but are not limited to, cutting, polishing, and/or coating pieces of glass from a blank. Many of these optical members are used in various apparatus employed in environments where they are exposed to ultraviolet light having a wavelength of about 360 nm or less, for example, an excimer laser beam or some other ultraviolet laser beam. The optical members are incorporated into a variety of instruments, including lithographic laser exposure equipment for producing highly integrated circuits, laser generation equipment, medical equipment, nuclear fusion equipment, or some other apparatus which uses a high-power ultraviolet laser beam.

As the photon energy, pulse energy and pulse rate of lasers increase, the optical members which are used in conjunction with such lasers are exposed to increased levels of energy. Fused silica has become widely used as the material of choice for optical members in such laser-based optical systems due to their excellent optical properties and resistance to light-induced damage.

Laser technology has advanced into the short wavelength, high energy ultraviolet spectral region, the effect of which is an increase in the frequency (decrease in wavelength) of light produced by lasers. Of particular interest are short wavelength lasers operating in the UV and deep LTV (DUV) and vacuum UV wavelength ranges, which include, but are not limited to, lasers operating at about 248 nm, 193 nm, 157 nm and even shorter wavelengths. Excimer laser systems are popular in microlithography applications, and the shortened wavelengths allow for increased feature resolution and thus line densities in the manufacturing of integrated circuits and microchips, which enables the manufacture of circuits having decreased feature sizes. A direct physical consequence of shorter wavelengths (higher frequencies) is higher photon energies. In such optical systems, fused silica optics are exposed to high irradiation levels for prolonged periods of time, and this may result in the degradation of the optical properties of the optical members.

It is known that such light-induced degradation adversely affects the optical properties and performance of the fused silica optics by decreasing light transmission levels, discoloring the glass, altering the index of refraction, altering the density, and increasing absorption levels of the glass. Over the years, many methods have been suggested for improving the optical damage resistance of fused silica glass. It has been generally known that high purity fused silica prepared by such methods as flame hydrolysis, CVD-soot remelting process, plasma CVD process, electrical fusing of quartz crystal powder, and other methods, is susceptible to laser damage to various degrees.

It has been reported that when silica glass is exposed to non-polarized or circularly polarized UV laser beam, usually in the peripheral area of the exposure light beam, additional birefringence (induced edge birefringence) is generated due to strain caused by laser damage, but in the center area of the light beam, there is usually negligible induced birefringence. Recently, a new phenomenon of laser damage to silica material has been observed: when the silica glass is exposed to linearly polarized deep UV laser beam, in addition to the induced edge birefringence, additional birefringence is induced in the center of the exposed area of the glass ("polarization-induced birefringence" or "PIB"). The induced birefringence, especially polarization-induced birefringence, is of particular concern to immersion lithography systems where a liquid fills the gap between the last lens element and the wafer in order to enlarge the numerical aperture of the lens system. In such immersion lithography systems, the polarization state of the UV radiation needs to be controlled, desirably linearly polarized. The induced birefringence in the glass alters the polarization state of the UV radiation, causing reduction of phase contrast and system resolution. Therefore, for deep UV and vacuum UV immersion lithographic systems, it is highly desirable that the glass material used in making the lens elements has low induced birefringence damage, especially a low polarization-induced birefringence, when exposed to linearly or elliptically polarized UV radiation, in addition to low light-induced wave-front distortion ("LIWFD") and high transmission.

Therefore, there exists a need for a synthetic silica material having, inter alia, a low level of polarization-induced birefringence, a low level of light-induced wavefront distortion, a high level of initial internal transmission, and method of making the same.

The present invention satisfies the above described needs for synthetic silica glass for use in lithographic applications.

SUMMARY OF THE INVENTION

According to a first aspect of the present invention, provided is an OD-doped synthetic silica glass material capable of being used in the light path of the lithographic irradiation of a lithographic device operating at a wavelength below about 300 nm, comprising OD and optionally OH, wherein the ratio of n(OD)/(n(OD)+n(OH)) is higher than $2 \times 10^{-4}$.

In one embodiment of the first aspect of the present invention, the glass comprises less than about 500 ppm by weight of OH and 0.15-1400 ppm OD.

In another embodiment of the first aspect of the present invention, the glass comprises less than about 150 ppm by weight of OH and about 0.1-1400 ppm OD.

In yet another embodiment of the first aspect of the present invention, the glass comprises less than about 20 ppm by weight of OH and about 0.01-1400 ppm OD.

In still another embodiment of the first aspect of the present invention, the glass comprises less than about 20 ppm by weight OH and between about 0.01-300 ppm OD.

In still another embodiment of the first aspect of the present invention, the glass comprises less than about 20 ppm by weight OH and between about 0.01-150 ppm OD.

In yet another embodiment of the first aspect of the present invention, the glass comprises less than about 1 ppm by weight OH and between about 0.01-150 ppm OD.

A second aspect of the present invention is an optical member capable of being used in the light path of the lithographic irradiation of a lithographic device operating at a wavelength below about 300 nm comprising the OD-doped synthetic silica glass of the present invention described summarily above and in detail below. In certain embodiments, the optical member is a refractive optical member where the irradiation travels through at least part of the body of the optical member. In certain other embodiments, the optical member is a reflective optical member where the irradiation is reflected upon at least part of the surface of the optical member.

A third aspect of the present invention is a lithographic system comprising the optical member of the present invention described summarily above and in detail below. In certain embodiments, the lithographic system is an immersion lithographic system. The lithographic system may operate at about 248 nm, 193 nm or even shorter.

A fourth aspect of the present invention is a process for making OD-doped synthetic silica glass material capable of being used in the light path of the lithographic irradiation of a lithographic device operating at a wavelength below about 300 nm, comprising the following steps:

(I) providing a plurality of particles comprising silica;

(II) depositing the a plurality of particles on a supportive deposition surface at an elevated temperature such that the particles are consolidated into transparent glass material in situ wherein:

either in step (I), the a plurality of particles provided are D-containing and/or in step (II), the deposition and consolidation are carried out in a D-containing atmosphere, such that the obtained silica glass comprises OD and optionally OH, and the ratio of n(OD)/(n(OD)+n(OH)) is higher than about $2 \times 10^{-4}$, in certain embodiments preferably higher than about 0.1, in certain other embodiments higher than about 0.3, in certain other embodiments higher than about 0.5, in certain other embodiments higher than 0.8, in yet still other embodiments higher than about 0.9.

A fifth aspect of the present application is a process for making OD-doped synthetic silica glass material capable of being used in the light path of the lithographic irradiation of a lithographic device operating at a wavelength below about 300 nm, comprising the following steps:

(A) providing a particle preform comprising a plurality of particles comprising silica;

(B) optionally purifying and/or drying the particle preform;

(C) optionally further doping the particle preform with dopants;

(D) consolidating the particle preform at an elevated temperature to dense glass; and (E) optionally treating the consolidated glass obtained in step (D) in the presence of $H_2$, HD and/or $D_2$, wherein in at least one of steps (A), (B), (C), (D) and (E), OD is introduced into or formed in the glass.

A sixth aspect of the present invention is a process for making OD-doped synthetic silica glass, comprising the following steps:

(a) providing a plurality of OD-doped particles comprising silica; and (b) melting the particles at an elevated temperature to obtain a transparent glass.

A seventh aspect of the present invention is a particle preform formed during a process of the present invention generally described above and in detail below.

An eighth aspect of the present invention is a process for making OD-doped synthetic silica glass capable of being used in the light path of the lithographic irradiation of a lithographic device operating at a wavelength below about 300 nm, comprising the following steps:

(a) providing a consolidated silica glass comprising OH;

(b) treating the consolidated glass in an atmosphere comprising $D_2$, $H_2$, and/or HD to effect H/D exchange to the desired [OH] and [OD] in the glass.

The OD-doped synthetic lithographic silica glass of the present invention has the advantage of higher optical performance at certain wavelength shorter than about 300 nm, such as at 193 nm, compared to conventional silica glass which is essentially non-OD-doped.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

Figure 1:
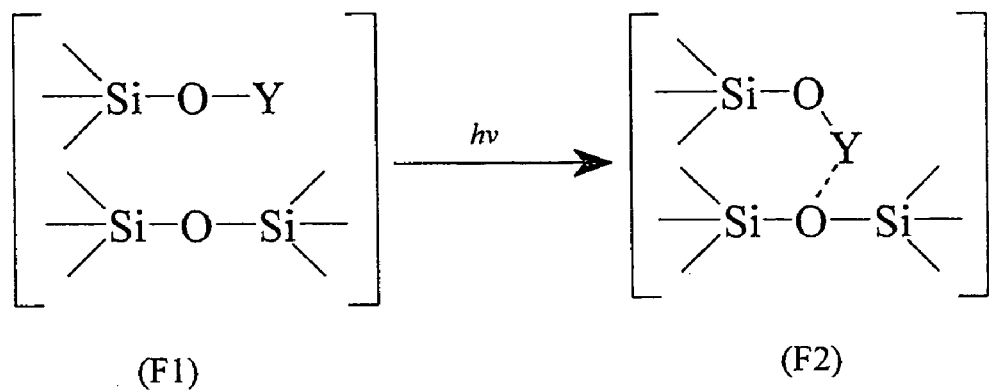
FIG. 1 is schematic illustration of a proposed mechanism accounting at least partly for polarization-induced birefringence in silica glass comprising OH and/or OD moieties.

As used herein, the term "D-containing compound" means a chemical compound or an elemental substance comprising deuterium atom(s) ($_1^2H$ or $_1^2D$, "D") and optionally pronium atom(s) ($_1^1H$, "H"), in which the ratio of n(D)/(n(D)+n(H)) is higher than the natural isotopic abundance of D, where n(D) is the total number of D atoms in the molecule of the D-containing compound, and n(H) is the total number of H atoms in the molecule of the D-containing compound. Examples of D-containing compound thus include, but are not limited to: $D_2$, DH, $CD_4$, $CDH_3$, $D_2O$, DHO, and the like. As used herein, the term "D-containing" means that an elemental substance, a compound, a material, or an atmosphere in which the ratio of n(D)/(n(D)+n(H)) is higher than the natural isotopic abundance of D.

As used herein, the term "hydroxyl(s)" or OH means a moiety or a group of moieties each consisting of an oxygen atom and a pronium atom (H). The oxygen atom may be $^{16}O$, $^{17}O$ or $^{18}O$, or mixtures thereof at any proportion. As used herein, n(OH) means the total number of OH moieties in a material.

As used herein, the term "deuteroxyl(s)" or OD means a moiety or a group of moieties each consisting of an oxygen atom and a deuterium atom (D). The oxygen atom may be $^{16}O$, $^{17}O$ or $^{18}O$, or mixtures thereof at any proportion. As used herein, n(OD) means the total number of OD moieties in a material.

In the present application, the two terms "hydroxyl-doped" and "OH-doped" are used interchangeably. A hydroxyl-doped or OH-doped material means the material comprises OH moieties and optionally OD moieties, and the ratio of n(OH)/(n(OD)+n(OH)) in the material is equal to or higher than the natural isotopic abundance of H. To that extent, a material in which all the OH moieties originate from normal water comprising $H_2O$ and $D_2O$ at essentially the natural isotopic abundances of H and D is regarded as OH-doped.

In the present application, the two terms "deuteroxyl-doped" or "OD-doped" are used interchangeably. A deuteroxyl-doped or OD-doped material means the material comprises OD moieties and optionally OH moieties, and the ratio of n(OD)/(n(OD)+n(OH)) in the material is higher than the natural isotopic abundance of D.

In the present application, OY means OH or OD or if not specified, both. Y—Y' means $D_2$ or $H_2$ or, if not specified, HD or any mixture or combination of two or three of them at any proportion.

By "F-doped" in the present application, it is meant that the glass comprises at least 1 ppm by weight of fluorine.

By "capable of being used in the light path of the lithographic irradiation of a lithographic device operating at a wavelength below about 300 nm," it is meant that:

(i) The material can be used in the light path of the lithographic irradiation while the lithographic device is being operated during the normal use for the intended function, i.e., performing lithography function in, e.g., the process of making semiconductor devices; and (ii) The material can be used in the light path for the purpose of re-directing or manipulating the lithographic irradiation.

One of ordinary skill in the art of lithography understands that for a material to be capable of being used in the light path of the lithographic irradiation of a lithographic device operating at a certain wavelength, the material should have the required composition and properties, such as internal transmission, laser induced wavefront distortion, induced absorption, and the like. One of ordinary skill in the art of lithography also understands that it is generally desired that the materials can be made at a reasonably low cost to the manufacturer and to the society at large (thus lower negative environmental impact if possible).

Typically, to be capable of being used in the light path of the lithographic irradiation of a lithographic device operating at a wavelength of below about 300 nm, the silica glass is desired to have an internal transmission at about 248 nm of at least 99.00%/cm. It is highly desired, in certain applications, especially lithographic applications for making semiconductor chips operating at about 193 nm, the silica glass has an internal transmission of at least 99.00%/cm at about 193 nm.

Typically, to be capable of being used in the light path of the lithographic irradiation of a lithographic device operating at a wavelength of below about 300 nm, the silica glass is desired to have a sodium concentration of lower than about 100 ppm by weight, in certain embodiments lower than about 50 ppm, in certain other embodiments lower than about 10 ppm. To be capable of being used in the in light path of lithographic irradiation of a lithographic device operating at a wavelength of below about 300 nm, such as at about 248 nm or about 193 nm, it is desired that the silica glass has a sodium concentration of lower than about 500 ppb by weight, in certain embodiments lower than about 100 ppb, in certain embodiments lower than about 50 ppb, in certain other embodiments lower than about 10 ppb.

Fictive temperature is a temperature at which a frozen-in glass structure would be at equilibrium. The Si—O—Si bond angle is a function of fictive temperature. The infrared absorption wavelength, or frequency, of Si—O—Si species varies with bond angle. Thus infrared absorption can be used to determine an approximate fictive temperature. An empirical relation between fictive temperature and absorption frequency is given in the prior art such as Agarwal et al., A simple IR spectroscopic method for determining fictive temperature of silica glasses, Journal of Non-crystalline Solids 185 (1995) 191. Raman scattering can also be used to determine fictive temperature using the scattering frequency of silica defects related to strained ring structure.

As used herein, the term "polarization-induced birefringence" means the peak measured birefringence level in the center portion of the uniformly exposed area of the glass after a certain time interval or laser pulses, if a pulsed laser beam is used, less the initial birefringence of the glass before the exposure. The polarization-induced birefringence levels as claimed in the present application are magnitude (absolute value) thereof. In the present application, when exposing the glass to quantify the polarization-induced birefringence level of the silica glass, a linearly polarized pulsed laser beam at approximately 193 nm having about 3 mm diameter with a given fluence and pulse length is directed to a fixed area of the glass sample. The birefringence at the center portion of the exposed area is measured after a certain number of pulses. The polarization-induced birefringence value is calculated by subtracting the initial birefringence of the glass from the measured center birefringence.

As used herein, the term "induced edge birefringence" means the measured peak birefringence level in the peripheral portion outside of but abutting the exposed area (i.e., the area right at the aperture where the light intensity changes from nominal value to zero) of the glass after a certain time interval or laser pulses, if a pulsed laser beam is used, less the initial birefringence of the glass before the exposure. In the present application, the induced edge birefringence of the silica glass is measured after a linearly polarized pulsed laser beam at approximately 193 nm having about 3 mm diameter with a given fluence and pulse length has been directed to a fixed area of the glass sample for a certain period of time or a given number of pulses. The induced edge birefringence value is calculated by subtracting the initial birefringence of the glass from the peak measured birefringence at the peripheral portion.

As used herein, "low polarization-induced birefringence" means a polarization-induced birefringence of less than or equal to 0.1 nm/cm measured at about 633 nm after being subjected to $5 \times 10^9$ pulses of linearly polarized pulsed laser beam at about 193 nm having a fluence of about 40 $\mu J \cdot cm^{-2} \cdot pulse^{-1}$ and a pulse length of about 25 ns.

As used herein, "normalized polarization-induced birefringence" is calculated from the measured polarization-induced birefringence as follows:

$$PIB(N) = \frac{PIB(M)}{N_1 \cdot F} \times 14,$$

where PIB(N) is normalized polarization-induced birefringence, PIB(M) is magnitude (i.e., absolute value thereof irrespective of sign thereof) of measured polarization-induced birefringence in nm/cm measured at about 633 nm, $N_1$ is number of pulses in billion pulses, F is fluence of the linearly polarized ArF laser to which the glass is exposed to in $mJ \cdot cm^{-2} \cdot pulse^{-1}$. For example, for a glass sample exposed to ArF laser with a fluence of 40 $\mu J \cdot cm^{-2} \cdot pulse^{-1}$ for $2 \times 10^{10}$ pulses having a magnitude of resultant measured PIB(A) of 0.2 nm/cm, its PIB(N) is calculated as follows:

$$PIB(N) = \frac{PIB(M)}{N_1 \cdot F} \times 14 = \frac{0.2}{20 \times 0.04} \times 14 = 3.5.$$

A single sample may have differing PIB(N) when measured at differing $N_1$ and F. Where $N_1$ and F are not specified, the PIB(N) value is average value.

Light-induced wavefront distortion of the bulk glass ("bulk LIWFD") is measured at 633 nm or 193 nm using method and apparatus available in the prior art. Normalized LIWFD of the glass subjected to pulsed ArF excimer laser (about 193 nm) measured at 633 nm (L633) and 193 nm (L193) are calculated in accordance with the following equations:

$$L633 = \frac{LB633}{0.95 \cdot \left(N' \cdot \frac{F^2}{\tau}\right)^{0.6}} \text{ and } L193 = \frac{LB193}{1.67 \cdot \left(N' \cdot \frac{F^2}{\tau}\right)^{0.6}},$$

where LB633 is the bulk LIWFD measured at 633 nm in nm/cm (could bear a "+" or "−" sign, depending on whether the glass compacts or expands), LB193 is bulk LIWFD measured at 193 nm in nm/cm (could bear a + or − sign, depending on whether the glass compacts or expands), N' is number of pulse in million of the linearly polarized ArF excimer laser to which the sample was exposed to when the LB633 or LB193 is measured, F is the fluence of the ArF excimer laser in $mJ \cdot cm^{-2}$ $pulse^{-1}$, and $\tau$ is pulse length of the ArF excimer laser in ns. The L633 and L193 values enable direct comparison of LIWFD performance of the silica glasses at different N', F and $\tau$ values.

Induced absorption (IA) of the glass upon exposure to an excimer laser at approximately 193 nm is reported in the present application. Normalized induced absorption (IA(N)) of the glass is further calculated from induced absorption. The calculation is done as follows in the present application:

$$IA = \log(T_1/T_2),$$

where $T_1$ is the internal transmission of the glass in terms of %/cm prior to laser exposure, and $T_2$ is the internal transmission of the glass in terms of %/cm after laser exposure; and $$IA(N) = \frac{IA \cdot \tau}{N' F^2},$$

where N' is number of pulses in the million, F is fluence of the ArF laser to which the glass is exposed to in $mJ \cdot cm^2 \cdot pulse^{-1}$, and $\tau$ is pulse length of the ArF excimer laser in ns.

As used herein, the term "variation of refractive index," or "refractive index variation," or "$\Delta n$," means the maximal variation of refractive indices measured in a plane perpendicular to the optical axis of the glass material or glass optical member along a predetermined direction by using interferometry at about 633 nm (He—Ne laser) (with tilt and piston taken out, as indicated infra). As is typically done by one skilled in the art, when discussing refractive index variation along a certain direction, tilt and piston are subtracted. Therefore, the refractive index variation along a certain direction (such as the radial direction in a sample prepared by using the OVD process) in the meaning of the present application does not include tilt or piston. Typically, the optical axis of a glass optical member, a glass blank, or a piece of glass material, is selected to be perpendicular to a plane (a cross-section) in which the measured refractive index inhomogeneity is the smallest, in order to obtain a glass member having large clear aperture area.

The preferred method, also the method used herein, for determination of interstitial molecular $H_2$ in fused silica is Raman scattering. Raman spectrometry is obtained using a T64000 spectrometer from HORIBA Jobin Yvon Inc. with an EEV charge-coupled device (CCD) detector. The hydrogen molecule concentration in molecules/$cm^3$ was obtained from the ratio of the intensity detected from the hydrogen molecule scattering peak at 4135 $cm^{-1}$ ($I_{4135}$) to the intensity of the silica scattering peak at 800 $cm^{-1}$ ($I_{800}$), i.e., $I_{4135}/I_{800}$, in the laser Raman spectrum (See, V. S. Khotimchenkô et al., Prikladnoi Spektroskopii, 46 (6), 987-997 (1986)). More specifically, the intensities of the peaks were determined by integrating the areas under the peaks using a linear or quadratic fit to the background. $D_2$ and HD concentrations in the glass in the present application were measured using Raman spectroscopy as well (see, e.g., B. Schrader, Infrared and Raman Spectroscopy, Methods and Applications, VCH, Weinheim (1995), ISBN 3-527-26446-9; H. Komine, *IEEE Journal of Quantum Electronics*, vol. QE-22, No. 4 (April 1986)). $D_2$ concentration was measured at 2973 $cm^{-1}$ and HD concentration was measured at 3606 $cm^{-1}$.

The OH group has characteristic absorption bands near 2.72 μm (3676 $cm^{-1}$), 2.21 μm (4525 $cm^{-1}$) and 1.38 μm (7246 $cm^{-1}$) in fused silica. Concentration of OH was measured by FTIR using the peak height of either the 3676 $cm^{-1}$ or the 4525 $cm^{-1}$ absorption band.

The OH concentration, c, in $mol \cdot liter^{-1}$, is derived from the Beers-Lambert Law $$A = \epsilon \cdot c \cdot b,$$

where the absorbance $A = \log(T_{ref}/T_{OH})$; $T_{ref}$=Transmittance of sample at reference position, a non-absorbing wavelength such as 4000 $cm^{-1}$; $T_{OH}$=Transmittance of sample at OH absorption peak (~3676 $cm^{-1}$ for silica); $\epsilon$ is the molar absorptivity in $liter \cdot mol^{-1} cm^{-1}$; c is concentration in $mol \cdot liter^{-1}$; and b is the pathlength (sample thickness) in cm:

$$c(mol \cdot liter^{-1}) = A/(\epsilon \cdot b).$$

Concentration of OH in ppm by weight was calculated from c in $mol \cdot liter^{-1}$ using the density of the silica glass (approximately 2.2 g/$cm^3$) and molecular weight of OH (approximately 17 g/mol). The constant c for high purity silica glass at a particular wavelength is available in the prior art.

Concentration of OD in silica glass was obtained in a similar manner, namely, starting from FTIR measurement and calculated by using the Beers-Lambert Law:

$$A' = \epsilon' \cdot c' \cdot b',$$

where the absorbance $A' = \log(T'_{ref}/T_{OD})$; $T'_{ref}$=Transmittance of sample at reference position, a non-absorbing wavelength such as 2780 cm$^{-1}$; $T_{OD}$=Transmittance of sample at OD absorption peak (~2705 cm$^{-1}$ for silica); $\epsilon'$ is the molar absorptivity in liter·mol$^{-1}$·cm$^{-1}$ (57.4 liter·mol$^{-1}$·cm$^{-1}$ at 2705 cm$^{-1}$); c' is concentration of OD in mol·liter$^{-1}$; and b' is the path length (sample thickness) in cm:

$$c'(\text{mol·liter}^{-1})=A'/(c'b').$$

Concentration of OD in ppm by weight was calculated from c' in mol·liter$^{-1}$ using the density of the silica glass (approximately 2.2 g/cm$^3$) and molecular weight of OD (approximately 18 g/mol). The constant $\epsilon'$ for high purity silica glass at a particular wavelength is available in the prior art.

As used herein, a "particle preform" means an object having a shape and comprising a plurality of solid particles. Thus a particle preform in the present application may be, for example, a soot preform consisting essentially of silica soot particles obtained from flame hydrolysis processes, a green body comprising a number of silica particles obtained from the sol-gel process, and the like.

As used herein, the term "soot dispenser" means a device which dispenses pre-formed soot particles by, e.g., spraying.

In search of silica glass materials with desired optical properties, especially in terms of initial internal transmission, LIWFD, light-induced absorption, polarization-induced birefringence, and the like, the present inventors have unexpectedly found that OD-doped high purity fused silica glass exhibits comparable, and in certain important respects, superior, performance than non-OD-doped glass with comparable OH concentration. The present invention is based on this discovery.

Silica glasses comprising $D_2$ (molecular deuterium) has been disclosed and studied in the prior art before. For example, U.S. Pat. No. 5,325,230(A) to Yamagata et al. mentions that $D_2$, as well as $H_2$, may be doped into fused silica glass. However, this reference does not provide an example of $D_2$ doped silica glass. Moreover, it does not mention doping silica glass with OD. Still, it does not mention the potential impact of doping silica glass with $D_2$ on the optical properties of the glass. For another example, J. E. Shelby, Molecular diffusion and solubility of hydrogen isotopes in vitreous silica, *Journal of Applied Physics*, Volume 48, No. 8 (August 1977), discloses the diffusion and solubility of $D_2$ in fused silica glass.

D. L. Fry et al., Hydrogen-Deuterium Exchange in Fused Silica, *Journal of The Optical Society of America*, Volume 50, No. 12 (December 1960), pages 1321-22, discusses OD-doped fused silica glass. No mention is made in this reference of the optical properties of the OD-doped fused silica glass in this article. Given the early publication date of this article, one of ordinary skill in the art can reasonably believe that the glass studied in this article did not have the required composition and optical properties for use in modern deep UV and vacuum UV lithography. James E. Shelby, Quantitative Determination of the Deuteroxyl Content of Vitreous Silica, *Communication of the American Ceramic Society* (January 1987), C-9 to C-10, discloses OD-doped fused silica glass and method for characterizing such glass. J. E. Shelby et al., Radiation-induced isotope exchange in vitreous silica, *Journal of Applied Physics*, 50(8) (August 1979), pages 5533-35, studied the formation of OD in fused silica glass from the reaction of silica and $D_2$ when exposed to γ-radiation.

None of the above references mentions a synthetic silica glass material capable of being used in the light path of the lithographic irradiation of a lithographic device operating at a wavelength below about 300 nm. None of the references above discloses or suggests the desirability of doping synthetic silica glass with OD or $D_2$ for UV lithographic applications. In view of the early publication dates of most of the above-mentioned references, one of ordinary skill in the art has reason to believe that the actual $D_2$ or OD-doped fused silica glass samples studied in the above references do not have the composition and properties required for use in deep UV or vacuum UV lithographic applications, especially in terms of initial internal transmission, LIWFD, polarization-induced birefringence, induced absorption and the like, such as at about 248 nm or 193 nm.

The present invention is described mostly in the context of microlithography at about 193 nm. However, it should be understood that the material of the present invention may be used in and for other applications, including but not limited to: lithography at about 248 nm, lithography at about 157 nm, i-line, g-line lithography, laser generators, lithographic inspection devices, and the like.

The present inventors have prepared synthetic silica glass materials doped with OD capable of being used in below 300 nm UV lithographic applications. As mentioned above, the present inventors have found that, unexpectedly, OD-doped lithographic synthetic silica glass materials, especially those with a high n(OD)/(n(OD)+n(OH)) ratio, tend to have better optical properties than non-OD-doped silica glass with essentially the same level of total concentration of OH and OD ([OH]+[OD]).

Figure 16:
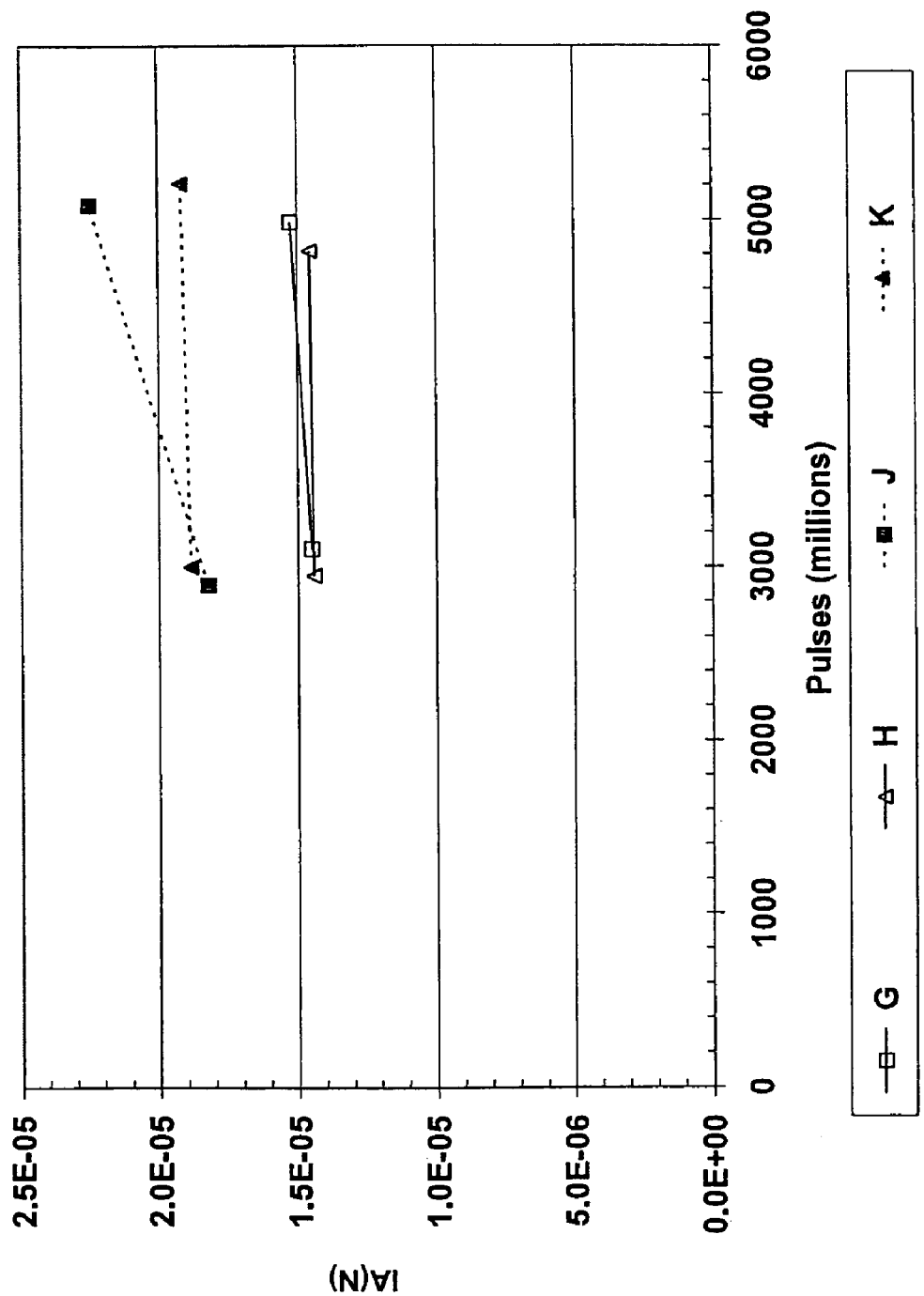
FIG. 16 is a diagram showing normalized induced absorbance, normalized IA, measured at 193 nm of the same series of OD-doped silica glass samples of the present invention, and the same series of OH-doped silica glass samples G, H, J and K as presented in FIG. 14 above, as a function of number of pulses of a pulsed laser beam having a wavelength of about 193 nm, a fluence of 600 $\mu J \cdot cm^{-2} \cdot pulse^{-1}$ and a pulse length of approximately 21 ns and a repetition rate of about 4 kHz to which the glass samples were exposed.

Moreover, the present inventors have discovered, unexpectedly, that OD-doped high purity fused silica glass exhibits improved light induced absorption (IA) over the corresponding OH-doped high purity fused silica glass. The data in FIG. 16 shows this improvement. The data is plotted as normalized induced absorbance (Normalized IA, IA(N)) at 193 nm which is calculated as described above.

Co-pending, co-assigned U.S. patent application Ser. No. 11/241,075, entitled "SYNTHETIC SILICA HAVING LOW POLARIZATION-INDUCED BIREFRINGENCE, METHOD OF MAKING SAME AND LITHOGRAPHIC DEVICE COMPRISING SAME" and filed on Sep. 30, 2005, now published as U.S. patent application Publication No. 2006-0137399 A1) discloses and studies the polarization-induced birefringence phenomenon in synthetic silica glass material, the content of which is incorporated herein by reference in its entirety. The silica glass materials studied in the examples of this patent application were essentially OH-doped. It states that "among others, OH concentration in the glass is a major factor affecting the polarization-induced birefringence of the glass. Generally, all other conditions remaining equal, the higher the OH level, the higher the polarization-induced birefringence of the glass. Thus, the present inventors have found that, to achieve a low level of polarization-induced birefringence in the silica glass, it is desired that the OH concentration in the glass is less than 500 ppm by weight, preferably less than 300 ppm, more preferably less than 100 ppm, still more preferably less than 50 ppm, most preferably less than 20 ppm."

Figure 2:
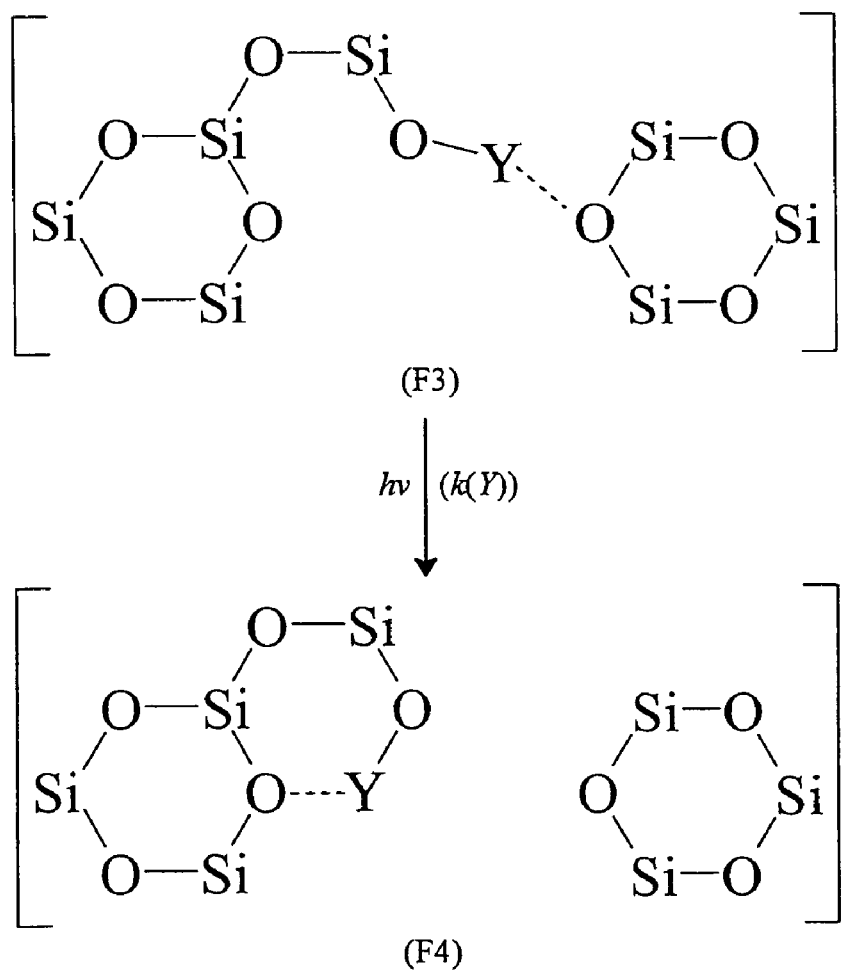
FIG. 2 is a schematic illustration of a proposed mechanism accounting at least partly for polarization-induced birefringence in silica glass comprising OH and/or OD moieties, and the difference in terms of level of polarization-induced birefringence between glasses having different n(OD)/(n(OD)+n(OH)) ratios.
Figure 3:
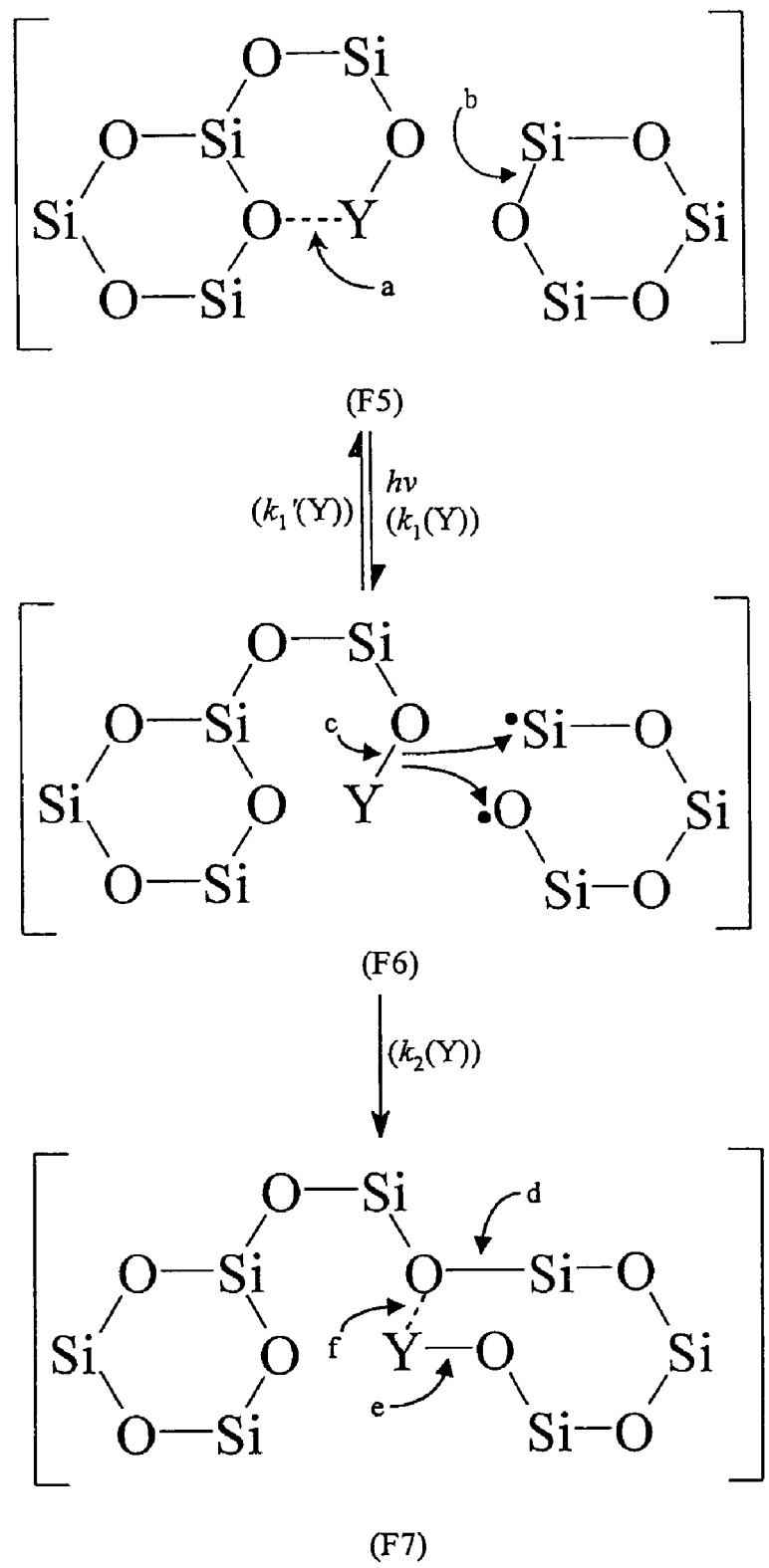
FIG. 3 is a schematic illustration of a proposed mechanism accounting at least partly for the polarization-induced birefringence and light-induced wavefront distortion (LIWFD) in silica glass comprising OH and/or OD moieties, and the difference in terms of level of polarization-induced birefringence and LIWFD between glasses having different n(OD)/(n(OD)+n(OH)) ratios.

With no intention or necessity to be bound by any particular theory, the present inventors present the following explanation of the mechanism of polarization-induced birefringence in fused silica glass comprising OH and/or OD, as well as the mechanism accounting for the lower polarization-induced birefringence in fused silica glass having a higher n(OD)/(n(OD)+n(OH)) ratio. The explanation is schematically illustrated in FIGS. 1-3 of the present application. In these three figures, Y represents H or D, and hydrogen bonds are shown as dotted lines.

A 1999 paper titled "Hydroxyl Groups in High-Purity Silica Glass," *Journal of Non-Crystalline Solids*, 261 (2000), pages 186-94, describes different types of OH bonding in $SiO_2$. The present inventors expect that ODs are bonded in the network of $SiO_2$ glass structure in essentially the same ways. FIG. 1 schematically illustrates a proposed mechanism aiming to interpret at least part of the polarization-induced birefringence generated in OH- and/or OD-containing silica glass. Formulae (F1) and (F2) represent the partial structures of a silica glass prior to and after exposure to UV irradiation, respectively. It is believed that initially, prior to the exposure to UV light, Si—OY bonds are randomly arranged in the $SiO_2$ network and certain hydrogen bonds are formed. Exposure to UV light can provide enough allowing activation energy for —OY (or —Y) bond movement (other wavelengths may be affective if there is sufficient absorption). If the light is linearly polarized then those bonds aligned with the light's polarization are activated and can move, resulting in the breakage of previously existing hydrogen bonds and/or formation of new hydrogen bonds; thus creating a Polarization-Induced Birefringence (PIB) damage in the sample. The more SiOY in the sample the more PIB damage: we are predicting an approximate linear response with ppm OY in the silica.

FIG. 2 schematically illustrates a photochemical reaction possibly involved in the polarization-induced birefringence phenomenon in a manner slightly different from that of FIG. 1. As in FIG. 1, the mechanism involves the breakage of certain hydrogen bonds pre-existing in the partial glass structure (F3) prior to exposure and the formation of new hydrogen bonds in the partial glass structure (F4) after exposure. The reaction rate k(Y) of the photoreaction is k(H) and k(D), respectively, when the atom Y in the figure is H and D, respectively. It is hypothesized by the present inventors that, due to the significant mass difference between D and H (approximately 2 times difference), the reaction rate k(D) is significantly lower than k(H). Accordingly, all other conditions, such as the total quantity of OY in the glass, remaining equal, silica glass with higher $n(OD)/(n(OD)+n(OH))$ ratio is expected to have lower polarization-induced birefringence.

Furthermore, in FIG. 3, the present inventors propose another mechanism in an effort to account for both LIWFD and polarization-induced birefringence as a result of exposure to linearly or elliptically polarized UV irradiation. This proposed mechanism is essentially a two-step reaction involving the breakage and formation of both hydrogen bonds and covalent bonds. The first step, a photolysis reaction having a reaction rate of $k_1(Y)$, involves the breakage of a covalent bond b (a Si—O bond) and possible breakage of a hydrogen bond a in the partial structure (F5) prior to exposure. The reverse reaction of this first step has a reaction rate of $k'_1(Y)$. The second step, having a reaction rate of $k_2(Y)$, involves the breakage of bond c (an O—Y bond) in an intermediate structure (F6), the formation of new bond d (a Si—O bond) and e (a Y—O bond), and possibly the formation of a new hydrogen bond f in the post-exposure partial structure (F7). Because (F5) is a less open and denser structure than F(7), the reactions result in a density change in the exposed area, hence LIWFD. It is hypothesized that both $k_1(D)<k_1(H)$ and/or $k_2(D)<k_2(H)$. Consequently, at essentially the same level of total OY concentration, silica glass with higher $n(OD)/(n(OD)+n(OH))$ ratio is expected to have lower polarization-induced birefringence, as well as lower LIWFD. Based on this hypothesis, silica glass doped with OY moieties (OD and/or OH) in which the oxygen atoms have higher proportions of $^{17}O$ and $^{18}O$ are expected to have lower level of polarization-induced birefringence and LIWFD as well. It may be possible in some applications to use other isotope of hydrogen, tritium (T), atoms in the preparation of the glass, thus forming OT-doped glass.

Figure 4:
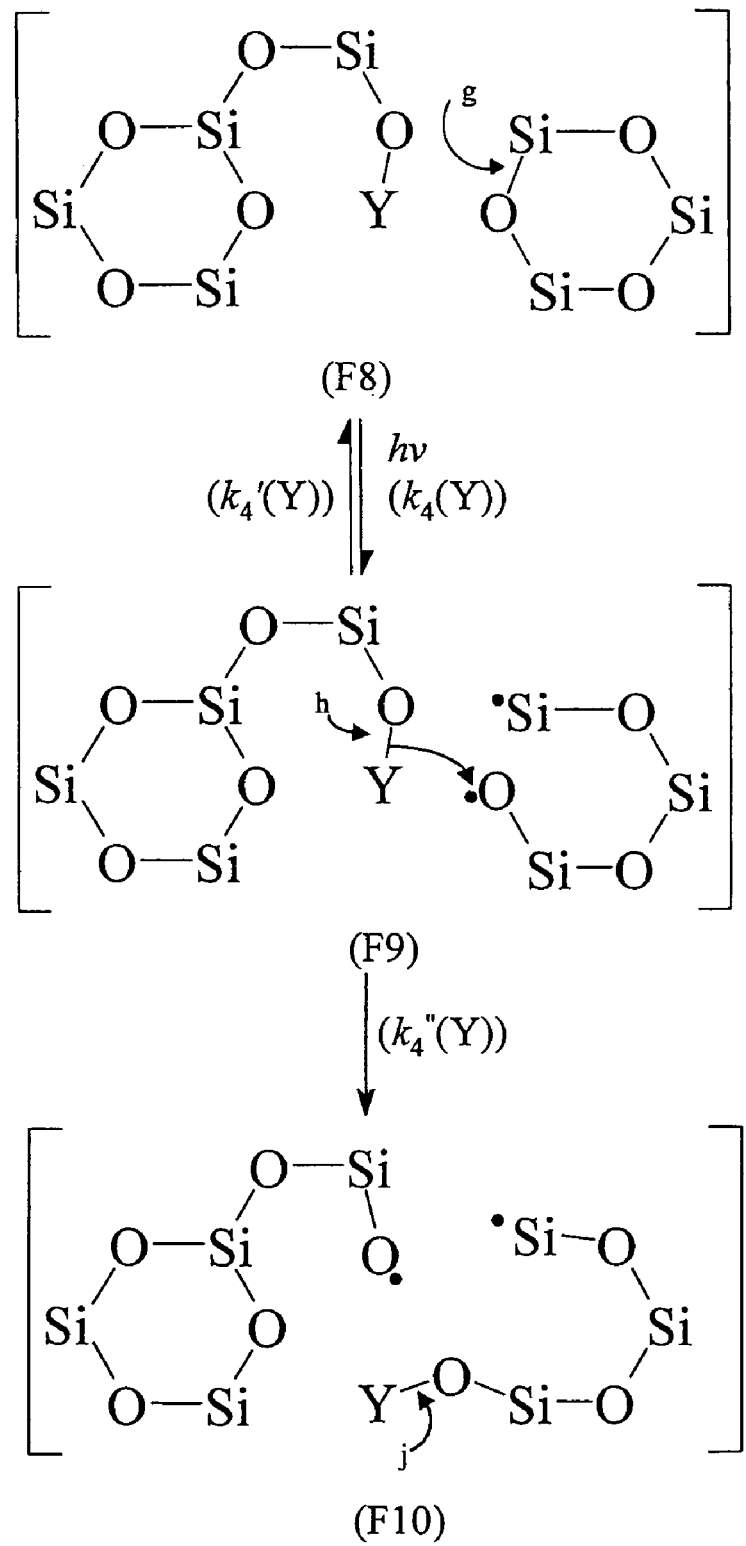
FIG. 4 is a schematic illustration of a proposed mechanism accounting at least partly for the induced absorption (IA) in silica glass comprising OH and/or OD moieties, and the difference in terms of level of induced absorption between glasses having different n(OD)/(n(OD)+n(OM)) ratios.

FIG. 4 explains at least partly the induced absorption of OH/OD-containing silica and the differing degrees thereof at various $n(OD)/(n(OD)+n(OH))$ ratios at approximately the same level of total [OD]+[OH] in the glass. It is known that the photolysis of the Si—O linkage in the glass due to exposure to high-energy photons could result in the production of E' center (Si—) and Si—O—, both believed to be absorbing in the deep UV and/or vacuum UV. E' center has a center absorption peak at about 215 nm, and extends to about 193 nm. According to the schematic illustration in this figure, the E' centers and Si—O— centers created in the photolysis reaction from structure (F8) to structure (F9) is reversible to a certain degree. Thus, some of the absorption centers would automatically heal by the reverse reaction from structure (F9) to structure (F8). It is hypothesized that the intra-network reaction from structure (F9) to structure (F10) resulted in E' center and Si—O— that have more distance than those in structure (F9), causing more difficulty to the combination reaction therebetween, thus leading to a relatively more stable structure with E' and Si—O—, and consequently induced absorption. The more structure (F10) in the glass network, the more stable absorption centers, hence the higher the induced absorption. It is believed that $k_4''(H)>k_4''(D)$. Consequently, at a same level of total [OH]+[OD], fewer structures (F10), which are more stable due to, inter alia, structure relaxation and the like, are formed in a silica glass with higher $n(OD)/(n(OD)+n(OH))$ ratio. This explains why silica glass doped with higher $n(OD)/(n(OD)+n(OH))$ ratio at essentially the same level of [OH]+[OD] tends to have lower level of induced absorption as observed by the present inventors from the OD-doped silica glasses of the present invention.

Figure 5:
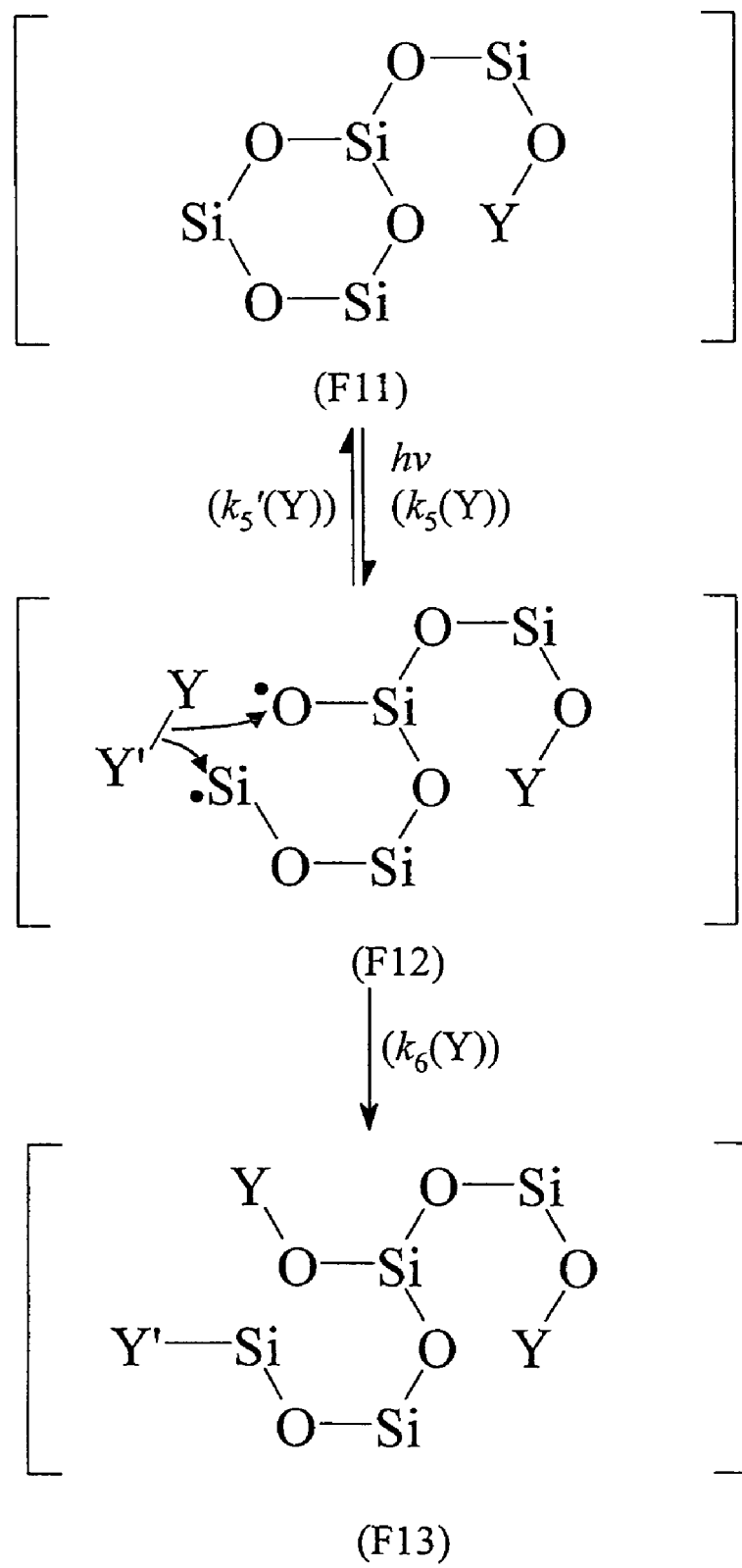
FIG. 5 is a schematic illustration of a proposed mechanism accounting at least partly for the induced absorption in silica glass comprising OH and/or OD moieties, and the effect of doped hydrogen molecules ($H_2$, $D_2$ and/or HD) in reducing induced absorption.

FIG. 5 is a schematic illustration of a mechanism accounting for the effect of hydrogen (Y—Y') molecules doped in the glass on the induced absorption of the glass. The hydrogen molecules reacts with the E' and SiO color centers to produce Si—OY and Si—Y'.

The OD-doped silica glass of the present invention is capable of being used in lithography below about 300 nm. It can be used in lithographic devices operating at longer wavelength, such as in the I-line lithography at about 365 nm. In certain preferred embodiments, the OD-doped silica glass of the present invention is capable of being used as refractive lens elements in the light path of the UV irradiation utilized in the dry lithographic devices operating at about 248 nm. In certain preferred embodiments, the OD-doped silica glass of the present invention has the composition and property requirements for use as refractive lens elements in the light path of the UV irradiation utilized in the immersion lithographic devices operating at about 248 nm. In certain other preferred embodiments, the OD-doped silica glass of the present invention is capable of being used as refractive lens elements in the light path of the UV irradiation utilized in the dry lithographic devices operating at about 193 nm. In certain preferred embodiments, the OD-doped silica glass of the present invention has the composition and property requirements for use as refractive lens elements in the light path of the UV irradiation utilized in the immersion lithographic devices operating at about 193 nm. One of ordinary skill in the art of lithography knows that for silica glasses to be used as lens elements in these applications, stringent requirements regarding optical performance such UV transmission, UV degradation in terms of induced absorption, light induced wavefront distortion (LIWFD), refractive index homogeneity, fictive temperature, birefringence, light induced birefringence, must satisfied. Ample literature has discussed the relationship between these required optical performance and the composition of the glass in terms of OH concentration and distribution, halogen concentration and distribution, alkali metal concentration and distribution, transition metal concentration and distribution, and the like. As discussed above, in a totally unexpected manner, the present inventors have discovered that high purity fused silica glass doped with OD has, inter alia superior performance in polarization-induced birefringence when subjected to linear polarized irradiation. Therefore, the glass of the present invention, especially those doped with high ratio of OD, can be advantageously used in immersion lithographic technology. Of course, the OD-doped silica glass may be used as the material for lens elements in reflective lithography operating in the vacuum UV and X-ray spectrum. These applications have special requirements on the other physical properties of the glass.

The natural isotopic abundance of deuterium (D) is about $1.15 \times 10^{-4}$ by mole. The OD-doped silica glass of the present invention has an $n(D)/(n(D)+n(H))$ higher than about $2 \times 10^{-4}$, thus higher than the natural isotopic abundance of D. The synthetic silica glass material of the present invention may be essentially devoid of OH. However, it is not ruled out that it may contain a certain level of OH in the glass. Nonetheless, in certain preferred embodiments of the OD-doped synthetic silica glass of the present invention, it has an $n(OD)/(n(OD)+n(OH))$ ratio of higher than about 0.05, in certain embodiments preferably higher than about 0.1, in certain embodiments preferably higher than about 0.2, in certain embodiments preferably higher than about 0.3, in certain embodiments preferably higher than about 0.4, in certain embodiments preferably higher than about 0.5, in certain other embodiments preferably higher than about 0.8, in certain other embodiments preferably higher than about 0.90, in certain other preferred embodiments higher than about 0.95, in certain other embodiments preferably higher than about 0.99. It has been demonstrated by the present inventors that high purity synthetic silica glass with various levels of [OD] can be obtained by using the soot-to-glass method. High isotopic purity $D_2O$ having a higher than 99.9% of $n(D)/(n(D)+n(H))$ may be employed in the soot-to-glass method of the present invention, to be described infra as one of the processes of the present invention, can be used to produce synthetic silica glass with $n(OD)/(n(OD)+n(OH))$ higher than 99%. When used with normal $H_2O$ at various proportions, synthetic silica glass with various levels of $n(OD)/(n(OD)+n(OH))$ can be produced.

In the OD-doped synthetic silica glass of the present invention, in the OD and optionally OH moieties, the oxygen atoms may be $^{16}O$, $^{17}O$ and $^{18}O$ at their natural isotopic abundances. The natural isotopic abundances of these three isotopes, by mole, are 99.757%, 0.038% and 0.205%, respectively. As described supra, in certain preferred embodiments, the silica glass of the present invention may comprise higher percentage of $^{17}O$ and $^{18}O$, especially $^{18}O$ (a stable isotope), than their respective natural isotopic abundances.

In certain embodiments of the OD-doped silica glass of the present invention, the glass has an OH concentration of lower than about 600 ppm by weight, in certain preferred embodiments preferably lower than about 160 ppm, in certain other preferred embodiments lower than about 50 ppm, in certain other embodiments preferably lower than about 20 ppm, in certain other embodiments preferably lower than about 1 ppm, in certain other embodiments still preferably lower than 0.1 ppm.

In certain embodiments of the OD-doped synthetic silica glass of the present invention, the glass has an OD concentration of lower than about 1400 ppm by weight, in certain preferred embodiments lower than about 1000 ppm, in certain preferred embodiments lower than about 800 ppm, in certain other preferred embodiments lower than about 500 ppm, in certain other preferred embodiments lower than about 300 ppm, in certain other preferred embodiments lower than about 150 ppm, in certain other preferred embodiments lower than about 50 ppm, in certain other preferred embodiments lower than about 20 ppm, in certain other embodiments lower than about 1 ppm, in certain embodiments between about 0.1-1400 ppm, in certain other embodiments between about 0.1-1000 ppm, in certain embodiments between about 0.1-800 ppm, in certain other embodiments between about 0.1-500 ppm, in certain other embodiments between about 0.01-150 ppm, in certain other embodiments between about 0.01-50 ppm, in certain other embodiments between about 0.01-20 ppm.

In certain embodiments of the OD-doped synthetic silica glass of the present invention, the glass has less than about 500 ppm by weight of OH and 0.15-1400 ppm OD. In certain embodiments of the OD-doped synthetic silica glass of the present invention, the glass comprises less than about 150 ppm by weight of OH and about 0.1-1400 ppm OD. In certain other embodiments of the OD-doped synthetic silica glass of the present invention, the glass comprises less than about 20 ppm by weight of OH and 0.01-1400 ppm OD. In certain other embodiments of the OD-doped synthetic silica glass of the present invention, the glass comprises less than about 20 ppm by weight of OH and about 0.01-300 ppm OD.

In certain embodiments of the OD-doped synthetic silica glass of the present invention, the glass has an essentially constant ratio of concentration of OD ([OD]) to the concentration of OH ([OH]) in different locations in the glass, i.e., [OD]/[OH]. By "essentially constant ratio," it is meant that the difference between the maximal ratio ($R_{max}$) and the minimal ratio ($R_{min}$) as measured has the following relationship: $2(R_{max}-R_{min})/(R_{max}+R_{min}) \leq 0.1$. In certain embodiments, $2(R_{max}-R_{min})/(R_{max}+R_{min}) \leq 0.05$.

In certain embodiments of the OD-doped synthetic silica glass of the present invention, the glass has a [OD] variation, measured in a plane essentially perpendicular to the optical axis of the glass, of less than about 10 ppm by weight, in certain embodiments less than about 5 ppm, in certain other embodiments less than about 2 ppm, in certain other embodiments less than about 1 ppm, in certain other embodiments less than about 0.1 ppm. In certain embodiments of the OD-doped synthetic silica glass of the present invention, the glass has, in addition to the or in absence of the [OD] variation described in this paragraph, an [OH] variation, measured in a plane essentially perpendicular to the optical axis of the glass, of less than about 10 ppm by weight, in certain embodiments less than about 5 ppm, in certain other embodiments less than about 2 ppm, in certain other embodiments less than about 1 ppm.

The OD-doped synthetic silica glass of the present invention may be essentially free of dopants other than OD and OH. However, it is not ruled that the OD-doped synthetic silica glass of the present invention comprises dopants such as Al, F, Cl and Ti. The Ti-containing OD-doped silica glass of the present invention may be advantageously used in the substrates for reflective optical elements, especially those requiring high thermal dimensional stability, such as those used in reflective lithography technology operating in vacuum UV and X-ray spectra. F-doped silica glass of the present invention may comprise, for example, fluorine in the amount of less than 1000 ppm by weight, in certain embodiments less than about 500 ppm, in certain other embodiments less than about 300 ppm, in certain other embodiments less than about 100 ppm, in certain embodiments less than about 50 ppm, in certain other embodiments less than about 10 ppm. In certain embodiments of the OD-dopes silica glass of the present invention, it comprises less than about 150 ppm by weight of OH, about 0.1-1400 ppm by weight OD and about 1-500 ppm by weight F. In certain other embodiments of the OD-doped synthetic silica glass of the present invention, the glass comprises less than about 20 ppm by weight of OH, about 0.01-1400 ppm OD and about 1-500 ppm F. In certain other embodiments of the OD-doped synthetic silica glass of the present invention, the glass comprises less than about 20 ppm by weight of OH, about 0.01-300 ppm OD and about 1-500 ppm F.

The OD-doped synthetic silica glass may be doped with molecular $H_2$, HD and/or $D_2$. In certain preferred embodiments, the OD-doped synthetic silica glass of the present invention has a concentration of $[H_2]$, $[HD]$ and $[D_2]$, in total, of between $1 \times 10^{15}$ to $1 \times 10^{19}$ molecules/cm$^3$, in certain embodiments higher than about $5 \times 10^{15}$ molecules/cm$^3$, in certain embodiments higher than about $1 \times 10^{16}$ molecules/cm$^3$, in certain preferred embodiments below about $5 \times 10^{18}$ molecules/cm$^3$, in certain other preferred embodiments below about $5 \times 10^{17}$ molecules/cm$^3$, in certain other preferred embodiments below about $1 \times 10^{17}$ molecules/cm$^3$, in certain other preferred embodiments between about $1 \times 10^6$ to $1 \times 10^{17}$ molecules/cm$^3$. In certain preferred embodiments of the OD-doped synthetic silica glass of the present invention, the ratio of $(2n(H_2)+n(HD))/2(n(H_2)+n(HD)+n(D_2))$ is higher than 0.1, in certain preferred embodiments higher than about 0.3, in certain other preferred embodiments higher than about 0.5, in certain other preferred embodiment higher than about 0.7, in certain other preferred embodiments higher than about 0.9. In certain preferred embodiment, the ratio of $(2n(H_2)+n(HD))/2(n(H_2)+n(HD)+n(D_2))$ in the glass is essentially the natural isotopic abundance of H by mole. In certain other embodiments, the ratio of $(2n(D_2)+n(HD))/2(n(H_2)+n(HD)+n(D_2))$ is higher than 0.1, in certain preferred embodiments higher than about 0.3, in certain other preferred embodiments higher than about 0.5, in certain other embodiment higher than about 0.7, in certain other preferred embodiments higher than about 0.9. In certain preferred embodiment, the ratio of $(2n(D_2)+n(HD))/2(n(H_2)+n(HD)+n(D_2))$ in the glass is essentially the natural isotopic abundance of D by mole.

As can be expected, the hydrogen molecules ($H_2$, $D_2$ and/or HD) in the silica glass may exchange with the OH or OD moieties in the glass network under suitable conditions. When a silica glass doped with —OY (where Y could be H and/or D) and $Y'_2$ (where Y' could be H or D or combinations thereof) is heated to an elevated temperature, such as at above about 1000° C., it is believed rate of such exchange reactions would increase significantly than at about room temperature. The following schematically illustrates the reaction:

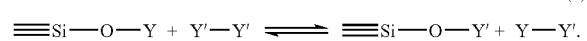

(1)

The result of the this reaction (1), therefore, would include, inter alia:

(i) For OH-doped silica glass doped with $D_2$ and/or HD, —OD can result in the glass network; and (ii) For OD-doped silica glass doped with $H_2$, the above reaction could result in a higher $n(OH)/(n(OD)+n(OH))$ ratio in the glass network.

It is believed that the above reaction (1) is very slow at around room temperature when the glass is not exposed to high-energy irradiations. Therefore, for an OD-doped glass doped with $H_2$ but no intentionally added $D_2$, it is expected that the glass would have a fairly stable $n(OD)/(n(OD)+n(OH))$ ratio at around room temperature if not exposed to irradiation that could accelerate the above reaction.

However, in a totally unexpected manner, it has been observed that, when the glass is exposed to high-energy UV light, such as an excimer laser at about 193 nm, the above reaction (1) is accelerated considerably even at around room temperature. As mentioned above, for an OD-doped silica glass doped with $H_2$ but no intentionally added $D_2$, the result of the accelerated reaction is the change (decrease) of $n(OD)/(n(OD)+n(OH))$ ratio over the life of the glass during which the glass is exposed to such high energy irradiation. This could be undesirable, as detailed herein, for the performance of the glass for some applications where a low [OH] and/or a low $n(OH)/(n(OH)+n(OD))$ is highly desired. Likewise, for applications which require a stable $n(OD)/(n(OD)+n(OH))$ ratio during the life of the material, the fluctuation of it should generally be limited to a tolerable range.

Therefore, in certain embodiments of the OD-doped silica glass of the present invention, it is desired that the total concentration of [OD]+[OH] in terms of mole·cm$^{-3}$ is significantly higher than the total concentration of hydrogen molecules (including $H_2$, $D_2$ and HD) in terms of mole·cm$^{-3}$. By "significantly higher," it is meant that, prior to being irradiated to a irradiation with a wavelength of below about 300 nm, the glass has a ratio of [OY]/[Y—Y'] of at least 10, in certain embodiments higher than about 50, in certain embodiments higher than about 100, in certain other embodiments higher than about 200, in certain other embodiments higher than about 500, in certain other embodiments higher than about 1000, where [OY]=[OH]+[OD], [Y—Y']=[$H_2$]+[$D_2$]+[HD], all in mole·cm$^{-3}$. In these glasses, even if the exchange reaction (1) is allowed to proceed to equilibrium, the impact on the final [OD]/([OH]+[OD]) upon exposure would be limited.

In certain embodiments of the OD-doped silica glass of the present invention, it is desired that the glass, prior to exposure to an irradiation having a wavelength of below about 300 nm, is essentially loaded only with $H_2$ and essentially no $D_2$. By "essentially no $D_2$," it is meant that the glass comprises $D_2$ in the amount of $[D_2] \leq 2 \times 10^{15}$ molecules/cm$^3$. In these embodiments, it is sometimes desired that $[OD]/[H_2]>10$, in certain embodiments $[OD]/[H_2]>20$, in certain embodiments $[OD]/[H_2]>50$, in certain embodiments $[OD]/[H_2]>100$, in certain embodiments $[OD]/[H_2]>200$, in certain embodiments $[OD]/[H_2]>300$, in certain embodiments $[OD]/[H_2]>500$, in certain embodiments $[OD]/[H_2]>800$, in certain embodiments $[OD]/[H_2]>1000$, where both [OD] and [$H_2$] are expressed in terms of mole-cm$^{-3}$. In these embodiments, it is sometimes desired that the glass, prior to exposure to an irradiation having a wavelength of below about 300 nm, has a $[H_2]<2 \times 10^{17}$ molecules/cm$^3$, in certain embodiments $[H_2]<1 \times 10^{17}$ molecules/cm$^3$, in certain embodiments $[H_2]<0.8 \times 10^{17}$ molecules/cm$^3$, in certain embodiments $[H_2]<0.5 \times 10^{17}$ molecules/cm$^3$, in certain embodiments $[H_2]<0.2 \times 10^{17}$ molecules/cm$^3$, in certain embodiments $[H_2]>1 \times 10^{15}$ molecules/cm$^3$, in certain embodiments $[H_2]>1 \times 10^{15}$ molecules/cm$^3$, in certain embodiments $[H_2]>5 \times 10^{15}$ molecules/cm$^3$; in certain embodiments $[H_2]<1 \times 10^{16}$ molecules/cm$^3$.

In certain other embodiments of the OD-doped silica glass of the present invention, it is desired that the glass, prior to exposure to an irradiation having a wavelength of below about 300 nm, is primarily loaded with $D_2$. By "primarily loaded with $D_2$," it is meant that in the glass $[D_2]/([D_2]+[H_2])$ is higher than about 0.5, in certain embodiments higher than about 0.6, in certain embodiments higher than about 0.7, in certain embodiments higher than about 0.8, in certain embodiments higher than about 0.9, in certain embodiments higher than about 0.95, in certain embodiments higher than about 0.99. Such OD-doped silica glass primarily loaded with $D_2$ is especially advantageous for OH-averse applications, such as immersion lithography operating at about 193 nm. In these embodiments, it is sometimes desired that [OD]/[$H_2$]>10, in certain embodiments [OD]/[$H_2$]>20, in certain embodiments [OD]/[$H_2$]>50, in certain embodiments [OD]/[$H_2$]>100, in certain embodiments [OD]/[$H_2$]>200, in certain embodiments [OD]/[$H_2$]>300, in certain embodiments [OD]/[$H_2$]>500, in certain embodiments [OD]/[$H_2$]>800, in certain embodiments [OD]/[$H_2$]>1000, where both [OD] and [$H_2$] are expressed in terms of mole·cm$^{-3}$. In these embodiments, it is sometimes desired that the glass, prior to exposure to an irradiation having a wavelength of below about 300 nm, has a [$H_2$]<$2\times10^{17}$ molecules/cm$^3$, in certain embodiments [$H_2$]<$1\times10^{17}$ molecules/cm$^3$, in certain embodiments [$H_2$]<$0.8\times10^{17}$ molecules/cm$^3$, in certain embodiments [$H_2$]<$0.5\times10^{17}$ molecules/cm$^3$, in certain embodiments [$H_2$]<$0.2\times10^{17}$ molecules/cm$^3$, in certain embodiments [$H_2$]>$1\times10^{15}$ molecules/cm$^3$, in certain embodiments [$H_2$]>$5\times10^{15}$ molecules/cm$^3$, in certain embodiments [$H_2$]<$1\times10^{16}$ molecules/cm.

In certain embodiments of the OD-doped synthetic silica glass of the present invention, the glass has an essentially constant ratio $R'$ of [$D_2$]/[$H_2$] at different locations of the glass. By "essentially constant ratio," it is meant that the difference between the maximal ratio ($R'_{max}$) and the minimal ratio ($R'_{min}$) as measured has the following relationship: $2(R'_{max}-R'_{min})/(R'_{max}+R'_{min}) \leq 0.1$. In certain embodiments, $2(R'_{max}-R'_{min})/(R'_{max}+R'_{min}) \leq 0.05$.

In certain embodiments of the OD-doped synthetic silica glass of the present invention, the glass has a concentration variation of OH and OD ([OH]+[OD]) measured in a plane perpendicular to at least one direction of less than about 50 ppm, in certain embodiments preferably less than about 30 ppm, in certain other embodiments preferably less than about 20 ppm, in certain other embodiments less than about 10 ppm, in certain other embodiments preferably less than about 1 ppm, in certain other embodiments preferably less than about 0.1 ppm.

In certain embodiments of the OD-doped silica glass of the present invention, the glass has a Cl concentration less than about 100 ppm, in certain embodiments less than about 50 ppm, in certain other embodiments less than about 10 ppm.

It is known that alkali, alkaline earth and transition metals can be detrimental to the transmission characteristics silica glasses. See, for example, Schultz, P. C., Optical Absorption of the Transition Elements in Vitreous Silica, Journal of The American Ceramic Society, 57 (7), pp 309-313, (July 1974); U.S. Pat. No. 6,174,509 B1 to Corning Incorporated, Pure Fused Silica, Furnace and Method; U.S. Pat. No. 6,698,248 B2 to Corning Incorporated, Methods and Furnaces for Fused Silica Production. U.S. Pat. No. 6,174,509 B1 discloses an article produced by collecting molten silica particles in a refractory furnace in which at least a portion of the refractory has been exposed to a halogen-containing gas to react with contaminating metal ions in the refractory. Improvement in the zircon refractory, as disclosed in U.S. Pat. No. 6,174,609, alleviated the affect of sodium ion contamination in a fused silica article. However, it was then found that other contaminants also exist in the furnace refractory in addition to sodium. These include the alkaline earth metals, and transition metals, such as iron, titanium and lead, aluminum, phosphorous and sulfur. U.S. Pat. No. 6,698,248 B2 discloses methods and apparatus for producing fused silica members having high internal transmission. The apparatus and methods as disclosed was capable of producing fused silica having internal transmission of at least 99.65%/cm at 193 nm. In this reference, it was stated that: "The next generation of fused silica glass used in the microlithography market will require ArF (193 nm) internal transmission exceeding 99.65%/cm, and preferably exceeding 99.75%/cm. The standard manufacturing processes described above is capable of consistently producing fused silica lens blanks with 99.5%/cm. Reduction of metal contaminants, which have a major impact on UV transmission, has played a major role in the production of higher transmission fused silica. The effects of metals, such as sodium, potassium and iron, are evident at the 10's of parts per billion level. The standard process has demonstrated the ability to produce fused silica having transmission of 99.65%/cm, without sacrificing glass homogeneity, but not in the quantity needed to make large production quantities of lens blanks and not with the consistency to serve as a basis for a production process. Accordingly, it would be desirable to provide methods and apparatus capable of consistently manufacturing large production quantities of fused silica having internal transmission equal to or greater than 99.65%/cm at 193 nm, and preferably greater than 99.75%/cm." It should be noted, however, that the silica glasses discussed in these references were all OH-containing, non-OD-doped.

It is also known that high purity synthetic silica glass material are required to have a very low level of alkali metals, alkaline earth and transition metals in order to have a sufficient transmission properties (e.g., absorption, induced absorption, fluence-dependent-transmission, birefringence, light-induced birefringence, LIWFD, and the like) in the wavelength of interest in the UV, such as for use as refractive members in KrF and ArF lithography devices. Certain metals having multiple oxidation states can cause more absorption at one oxidation state than at others. Thus, in certain embodiments of the OD-doped silica glass of the present invention, the glass comprises less than 100 ppm by weight, in certain embodiments less than about 50 ppm, in certain embodiments less than about 10 ppm, in certain embodiments preferably less than 1 ppm, in certain embodiments preferably less than 500 ppb, in certain embodiments less than about 300 ppb, in certain embodiments less than about 100 ppb, in certain embodiments less than 50 ppb, in certain embodiments preferably less than about 20 ppb, in certain other embodiments preferably less than about 10 ppb, of any alkali metal, any alkali earth metal, and any transition metal. Among all metals, sodium is one of the most difficult to reduce from the glass composition because it is virtually ubiquitous and can be introduced into the glass in the handling process. Sodium also diffused into consolidated glass and soot preforms extraordinarily fast at elevated temperatures, especially at above 800° C. Nonetheless, in order for the glass to have the capability to be used as refractive optical element in a lithographic device operating at a wavelength below about 300 nm, such as at about 248 nm or 193 nm, it is typically desired that the glass comprises sodium lower than about 100 ppb by weight, in certain embodiments lower than about 50 ppb, in certain embodiments lower than 30 ppb, in certain embodiments lower than about 10 ppb (such as for use in lithography devices operating at about 193 nm), and in certain embodiments lower than 5 ppb. The present inventors have made OD-doped high purity silica glass with such low level of sodium. In certain embodiments, the glass comprises any transition metal at less than 2 ppb. In certain other embodiments, the glass comprises any transition metal at less than 1 ppb. In certain other embodiments, the glass comprises any transition metal at less than 0.5 ppb. In certain embodiments, especially for glasses to be used as refractive optical member in ArF laser lithography devices, it is preferred that the glass comprises any individual element in all oxidation states of the following in concentrations less than 2 ppb by weight, in certain embodiments preferably less than 1 ppb, in certain other embodiments less than 0.5 ppb, in certain other embodiments less than 0.1 ppb: Ti (+2, +4, for example), V (+5, +4, for example), Cr (+6, +3, for example), Mn (+6, +4, +2, for example), Fe (+3, +2, for example), Co (+3, +2, for example), Ni (+2, for example), Cu (+2, +1, for example), Zn (+2, for example), Ge (+4, +2, for example), Zr (+4, for example), Ag (+1, for example), Cd (+1, for example), Sn (+4, +2, for example), Pb (+4, +2, for example), Bi (+5, +3, for example) and U (+6, +3, for example). Of course, elemental metals (in 0 state) are generally detrimental to the transmission properties of the glass. In certain embodiments of the OD-doped synthetic silica glass of the present invention, it comprises less than 100 ppm by weight, in certain embodiments less than about 50 ppm, in certain embodiments less than about 10 ppm, in certain embodiments preferably less than 1 ppm, in certain embodiments preferably less than 500 ppb, in certain embodiments less than about 300 ppb, in certain embodiments less than about 100 ppb, in certain embodiments less than about 50 ppb, in certain embodiments preferably less than 30 ppb, in certain other embodiments preferably less than 10 ppb, of any and all metals in all oxidation states in total. Similar low levels of such elements are also desired for OH-doped lithographic silica glass and F-doped lithographic silica glass.

In certain preferred embodiments of the OD-doped synthetic silica glass of the present invention, the glass exhibits a light-induced wavefront distortion (LIWFD), measured at 633 nm, of between −0.1 and 0.1 nm/cm, in certain preferred embodiments between −0.5 to 0.5 nm/cm, in certain other preferred embodiments between about 0 and 1 nm/cm, in certain other preferred embodiments between about 0 and 0.5 nm/cm, when subjected to 10 billion pulses of a laser beam operating at approximately 193 nm and having a fluence of approximately 70 $\mu J/(cm^2 \cdot pulse)$ and a pulse length of approximately 25 ns.

In certain embodiments of the OD-doped synthetic silica glass of the present invention, the glass exhibits, in addition to or in absence of the LIWFD properties described above, a normalized wavefront distortion L633 when subjected to excimer laser pulses at about 193 nm of less than or equal to about 20 billion pulses, measured at about 633 nm, wherein −1.0<L633≦1.0, in certain embodiments −0.5≦L633≦1.0, in certain embodiments −0.1≦L633≦1.0, in certain embodiments 0≦L633≦1.0, in certain preferably embodiments 0≦L633≦0.5, in certain other preferred embodiments 0≦L633≦0.4, in certain other embodiments preferably 0≦L633≦0.3.

In certain embodiments of the OD-doped synthetic silica glass of the present invention, the glass exhibits, in addition to or in absence of the LIWFD and L633 properties described above, a normalized wavefront distortion L193 when subjected to excimer laser pulses at about 193 nm of less than or equal to about 20 billion pulses, measured at about 193 nm, wherein −1.0<L193≦1.0, in certain embodiments −0.5≦L193≦1.0, in certain embodiments −0.1≦L193≦1.0, in certain embodiments 0≦L193≦1.0, in certain embodiments preferably 0≦L193≦0.5, in certain embodiments preferably 0≦L193≦0.4, in certain other embodiments preferably 0≦L193≦0.3.

In certain embodiments of the OD-doped synthetic silica glass of the present invention, the glass exhibits less than about 1 nm/cm, in certain embodiments preferably less than 0.1 nm/cm, of polarization-induced birefringence (magnitude) measured at about 633 nm after being subjected to $5 \times 10^9$ pulses of linearly polarized pulsed laser beam at about 193 nm having a fluence of about 40 $\mu J \cdot cm^{-2} \cdot pulse^{-1}$ and a pulse length of about 25 ns. In certain other embodiments of the OD-doped synthetic silica glass of the present invention, the glass exhibits less than about 1 nm/cm, in certain embodiments preferably less than 0.1 nm/cm, of polarization-induced birefringence (magnitude) measured at about 633 nm after being subjected to $1 \times 10^{10}$ pulses of linearly polarized pulsed laser beam at about 193 nm having a fluence of about 40 $\mu J \cdot cm^{-2} \cdot pulse^{-1}$ and a pulse length of about 25 ns. In certain embodiments of the OD-doped synthetic silica glass of the present invention, the glass exhibits less than about 0.1 nm/cm of polarization-induced birefringence (magnitude) measured at about 633 nm after being subjected to $2 \times 10^{10}$ pulses of linearly polarized pulsed laser beam at about 193 nm having a fluence of about 40 $\mu J \cdot cm^{-2} \cdot pulse^{-1}$ and a pulse length of about 25 ns. In certain embodiments of the OD-doped synthetic silica glass of the present invention, the glass exhibits less than about 0.04 nm/cm of polarization-induced birefringence (magnitude) measured at about 633 nm after being subjected to $2 \times 10^{10}$ pulses of linearly polarized pulsed laser beam at about 193 nm having a fluence of about 40 $\mu J \cdot cm^{-2} \cdot pulse^{-1}$ and a pulse length of about 25 ns. In certain embodiments of the synthetic silica glass of the present invention, the glass exhibits higher than about 0.001 nm/cm of polarization-induced birefringence (magnitude) measured at about 633 nm after being subjected to $2 \times 10^{10}$ pulses of linearly polarized pulsed laser beam at about 193 nm having a fluence of about 40 $\mu J \cdot cm^{-2} \cdot pulse^{-1}$ and a pulse length of about 25 ns. In certain embodiments of the OD-doped synthetic silica glass of the present invention, the glass exhibits higher than about 0.01 nm/cm of polarization-induced birefringence (magnitude) measured at about 633 nm after being subjected to $2 \times 10^{10}$ pulses of linearly polarized pulsed laser beam at about 193 nm having a fluence of about 40 $\mu J \cdot cm^{-2} \cdot pulse^{-1}$ and a pulse length of about 25 ns.

In certain embodiments of the OD-doped synthetic silica glass of the present invention, the glass exhibits a normalized polarization-induced birefringence less than 10, in certain embodiments less than 5, when subjected to linearly-polarized excimer laser pulses at about 193 nm of less than or equal to about 20 billion pulses.

In certain embodiments of the OD-doped silica glass of the present invention, the glass exhibits a polarization-induced birefringence less than about 0.04 nm/cm, in certain embodiments less than about 0.02 nm/cm of polarization-induced birefringence measured at about 633 nm after being subjected to $2 \times 10^9$ pulses of linearly polarized pulsed laser beam at about 193 nm having a fluence of about 200 $\mu J \cdot cm^{-2} \cdot pulse^{-1}$ and a pulse length of about 25 ns, in certain embodiments less than about 0.02 nm/cm of polarization-induced birefringence measured at about 633 nm after being subjected to $5 \times 10^9$ pulses of linearly polarized pulsed laser beam at about 193 nm having a fluence of about 200 $\mu J \cdot cm^{-2} \cdot pulse^{-1}$ and a pulse length of about 25 ns.

In certain embodiments of the OD-doped silica glass of the present invention, the glass exhibits a normalized polarization-induced birefringence less than 2, in certain embodiments less than 1, in certain embodiments less than 0.5, when subjected to linearly-polarized excimer laser pulses at about 193 nm of less than or equal to about 2 billion pulses. In certain embodiments, the glass exhibits a normalized polarization-induced birefringence less than 2, in certain embodiments less than 1, in certain embodiments less than 0.5, when subjected to excimer laser pulses at about 193 nm of less than or equal to about 5 billion pulses. In certain other embodiments, the glass exhibits a normalized polarization-induced birefringence less than 2, in certain embodiments less than 1, in certain embodiments less than 0.5, when subjected to excimer laser pulses at about 193 nm of less than or equal to about 8 billion pulses.

In certain embodiments of the OD-doped synthetic silica glass of the present invention, the glass exhibits an initial internal transmission at about 193 nm of at least 99.00%/cm, in certain embodiments desirably at least 99.50%/cm, in certain embodiments desirably at least 99.65%/cm, in certain embodiments preferably at least 99.75%/cm, in certain other embodiments preferably at least 99.80%/cm.

In certain embodiments of the OD-doped synthetic silica glass of the present invention, the glass exhibits a fictive temperature of lower than about 1150° C. In certain other embodiments of the OD-doped synthetic silica glass of the present invention, the glass exhibits a fictive temperature of lower than about 1000° C. In certain embodiments of the glass of the present invention, it exhibits a fictive temperature of higher than about 800° C.

In certain embodiments of the OD-doped synthetic silica glass of the present invention, the glass exhibits a refractive index variation measured in a plane perpendicular to at least one direction of less than about 10 ppm, in certain embodiments preferably less than about 5 ppm, in certain other embodiments preferably less than about 2 ppm, in certain other embodiments preferably less than about 1 ppm, in certain other embodiments preferably less than about 0.5 ppm.

Another aspect of the present invention is an optical glass member comprising the OD-doped synthetic silica glass material of the present invention described in general and in detail above and illustrated below. The optical glass member advantageously is used in the light path of an irradiation having a wavelength of shorter than about 300 nm, though the glass member of the present invention may be used in the light path of irradiation having a longer wavelength, such as in the visible spectrum, or in the infrared spectrum. The OD-doped glass of the present invention is particularly advantageous for use in certain infrared applications where OH is undesirable and OD is acceptable. Non-limiting examples of such glass member of the present invention may include, but are not limited to, optical members for use as refractive lens elements, sputter targets, and the like. The refractive lens elements may be used in, e.g., lithographic scanners and steppers machines, laser generators, laser etalons, lithographic inspection devices, and the like. The OD-doped glass optical member of the present invention is particularly suited for devices involving high-fluence irradiations due to its improved laser damage resistance.

Still another aspect of the present invention is a lithographic system comprising at least one optical member of the present invention. The lithographic system is advantageously an immersion system in which at least one lens element is allowed to contact a liquid. Emersion lithographic systems usually utilize linearly polarized irradiation. Due to the high resistance to polarization-induced birefringence damage, the OD-doped synthetic silica glass member of the present invention is particularly suitable for such lithographic systems. Due to the excellent performance of the OD-doped glass material of the present invention, as mentioned supra, it may be used in traditional dry lithographic tools operating below about 300 nm, such as at about 248 nm, 193 nm and 157 nm.

The OD-doped synthetic silica glass material of the present invention may be produced by using various methods, such as the direct-to-glass method, the soot-to-glass methods and the sol-gel processes, to name a few. Generally, the OD-doped silica glass of the present invention may be produced by: (i) utilizing D-exchanged or D-enriched starting materials to produce silica; (ii) making silica glass in a D-rich environment; or (iii) doping silica glass with OD.

The first method contemplated by the present inventors is a direct-to-glass method. Broadly speaking, this process includes the following steps:

(I) providing a plurality of particles comprising silica;

(II) depositing the a plurality of particles on a supportive deposition surface at an elevated temperature such that the particles are consolidated into transparent glass material in situ, wherein:

in step (II), the deposition and consolidation are carried out in a D-containing atmosphere, such that the obtained silica glass comprises OD and optionally OH, and the ratio of $n(OD)/(n(OD)+n(OH))$ is higher than about $2\times10^{-4}$, in certain embodiments preferably higher than about 0.05, in certain embodiments preferably higher than about 0.1, in certain other embodiments higher than about 0.3, in certain other embodiments higher than about 0.5, in certain other embodiments higher than 0.8, in yet still other embodiments higher than about 0.9, in certain other embodiments higher than about 0.95.

In step (I), the a plurality of particles comprising silica may be provided by flame hydrolysis of at least one precursor compound comprising silicon, such as silicon halides (such as $SiCl_4$) or organosilicon compounds. As non-limiting example of organosilicon compound, mention may be made of octamethylcyclotetrasiloxane (OMCTS). The precursor compound may comprise D at a level higher than its natural isotopic abundance (such as D-containing OMCTS), in which case the particles per se are usually OD-doped when originally produced. Alternatively, the precursor compound may comprise D at a level no more than its natural isotopic abundance, yet the precursor compound is allowed to undergo flame hydrolysis in an atmosphere comprising D at a level higher than its natural isotopic abundance, such as an atmosphere comprising added $D_2O$ or $D_2O$ produced from burning D-containing compound as fuel, such as $CD_4$, $CDH_3$, $CD_2H_2$, $D_2$, HD, and the like. The particle comprising silicon may be pre-fabricated or produced in situ in the same furnace where they are deposited and consolidated in step (II). Where they are pre-fabricated, they may be provided in step (I) via a soot dispenser, sprayed to the supportive deposition surface and allowed to consolidate. If the pre-fabricated particles are D-containing, step (II) may be carried out in an environment that is D-containing or not, depending on the level of OD in the pre-fabricated particles and the desired level of OD in the final consolidated glass. If the pre-fabricated particles are not D-containing, step (II) should be carried out in a D-containing environment (such as in the presence of $D_2O$ or $D_2$ gas or combinations thereof) in order to introduce OD into the consolidated glass. This direct-to-glass method for making the OD-doped silica glass of the present invention may be plasma-assisted. By adjusting the ratio of $n(D)/(n(D)+n(H))$ in the atmosphere in which the particles are produced, and in the atmosphere in which step (II) is carried out, one can produce OD-doped final glass with desired level of OD-doping.

There is abundant literature on equipment and processes for making high-purity fused silica material by using the direct-to-glass method, which can be adapted for making high-purity OD-doped fused silica glass of the present invention. For example, it is highly desired that the supportive deposition surface in step (II) is an essentially planar deposition surface of a horizontal rotating table. Generally, in order to obtain OD-doped fused silica glass for use in deep UV and vacuum UV lithographic devices, the glass should be produced by using high purity raw materials and processing agents in a very clean environment, and care should be taken to avoid contamination by metals detrimental to the desired properties. Low metal impurities are obtained via high purity starting materials and apparatus for making the soot (and corresponding consolidated glass) and/or purifying the soot (and apparatus used to consolidate the soot) with, e.g., $Cl_2$ or $Cl_2+CO$, to remove trace metals. However, as in the case of producing regular non-OD-doped high purity fused silica, where desired, it is also possible to dope the OD-doped synthetic silica glass material with various dopants, such as F, Al, Ti, and the like, in a direct-to-glass furnace. Where the particles in step (I) are pre-fabricated, they may have essentially the same composition or differing compositions (e.g., certain particles comprising dopants and particles essentially free of dopants can be mixed and provided in step (I)).

The consolidated glass produced in step (II) may be further subjected to the following step:

(III) treating the consolidated glass obtained in step (II) in an atmosphere comprising $H_2$ and/or HD and/or $D_2$.

The purpose of step (III) is to adjust the level of molecular hydrogen ($H_2$, HD and/or $D_2$) in the consolidated glass to a desired level. Hydrogen molecules doped at desired level in the glass can improve the optical performance of the material. Such hydrogen-treatment is desired to be conducted below about 600° C. In certain cases it may be desired to be conducted at above about 600° C. Generally, it is desired that it is carried out at below about 1000° C. Generally, it is desired that the treatment time and temperature of step (III) is chosen such that the sum total of the concentration of $H_2$, HD and $D_2$ in the treated glass is between about $0.5\times10^{15}$ to about $5\times10^{19}$ molecules/cm$^3$, in certain embodiments preferably from about $0.5\times10^{15}$ to about $5\times10^{18}$ molecules/cm$^3$, in certain other embodiments preferably from about $1\times10^{15}$ to about $1\times10^{18}$ molecules/cm$^3$ in certain embodiments preferably from about $0.5\times10^{16}$ to about $5\times10^{18}$ molecules/cm$^3$, in certain other embodiments preferably from about $1\times10^{16}$ to about $1\times10^{18}$ molecules/cm$^3$. In certain embodiments, it is desired that the atmosphere in which step (III) is D-containing, i.e., the atmosphere has a ratio of $(2n(D_2)+n(HD))/2(n(H_2)+n(D_2)+n(HD))$ higher than the natural isotopic abundance of D. It is also desired that after step (III), the ratio of $[D_2]/[H_2]$ at different locations in the glass is essentially constant, i.e., the distribution profiles of $D_2$ and $H_2$ are essentially the same (though maybe at differing concentrations). However, to lower the cost, it may be desired that in step (III), the atmosphere is essentially non-D-containing, i.e., the atmosphere has a ratio of $(2n(H_2)+n(HD))/2(n(H_2)+n(D_2)+n(RD))$ higher than or about equal to the natural isotopic abundance of H.

Another method of the present invention for making OD-doped synthetic silica glass of the present invention, termed "particle-to-glass" herein, involves the formation of a porous particle preform. This method comprises the following steps:

(A) providing a particle preform comprising a plurality of particles comprising silica;

(B) optionally purifying and/or drying the particle preform;

(C) optionally further doping the particle preform with dopants;

(D) consolidating the particle preform at an elevated temperature to dense glass; and (E) optionally treating the consolidated glass obtained in step (D) in the presence of $H_2$, HD and/or $D_2$, wherein in at least one of steps (A), (B), (C), (D) and (E), OD is introduced into or formed in the glass. Generally, it is preferred that in at least one of steps (A), (B), (C) and (D), OD is introduced into the glass.

In one embodiment of this process, step (A) comprises the following steps:

(A1) providing a plurality of particles; and (A2) depositing the particles on a supporting surface to form the particle preform. The supporting surface is preferred to be rotating in certain embodiments.

In step (A1), the particles may be provided by (A1.1) flame hydrolysis of at least one silicon-containing precursor compound (such as silicon halides (e.g., $SiCl_4$) or organosilicon compounds. As non-limiting example of organosilicon compound, mention may be made of octamethylcyclotetrasiloxane (OMCTS)), which may be plasma-assisted; or (A1.2) a soot dispenser, which may be plasma-assisted; or (A1.3) other plasma-assisted process. In the present application, the particle-to-glass process involving step (A1.1) is termed "soot-to-glass" process. Soot-to-glass process for making regular non-OD-doped high-purity fused silica glass is described in, for example, co-pending, co-assigned patent application Ser. No. 11/148,764, entitled "HIGH REFRACTIVE INDEX HOMOGENEITY FUSED SILICA GLASS AND METHOD OF MAKING SAME" and filed on Jun. 8, 2005, now published as U.S. patent application Publication No. 2006-0137398 A1, the relevant part of which is incorporated herein by reference.

Particles provided by step (A1.1) may be OD-doped or non-OD-doped. Where D-containing compounds are used in the flame hydrolysis process, the particles provided are usually OD-doped. If the atmosphere of the flame hydrolysis process of step (A1.1) comprises $D_2O$, the particles thus provided are usually OD-doped.

Step (A2) can be carried out by various methods such as (A2.1) outside vapor deposition; (A2.2) inside vapor deposition; (A2.3) vapor axial deposition; (A2.4) planar deposition, and the like. There is abundance literature describing these methods for making regular non-OD-doped glass comprising silica, which can be adapted for making the OD-doped synthetic silica glass of the present invention.

The sol-gel process may be employed in step (A) to produce the particle preform, which comprises the following steps:

(A(i)) forming a sol-gel comprising silica; and (A(ii)) forming the particle preform from the sol-gel.

Step (A(i)) may be carried out in the presence of or from at least one D-containing compound. In particular, step (A(i)) may be carried out in the presence of $D_2O$. For example, the sol-gel can be produced by the hydrolysis of a silicon-containing precursor compound (such as siloxane) in liquid $D_2O$. Thus the particle preform produced in step (A) comprises OD-doped silica particles. There is abundant literature describing methods for making non-OD-doped glass comprising silica via the sol-gel process, which can be adapted for making the OD-doped synthetic silica glass of the present invention. Typically, the sol-gel process includes a step of hydrolysis of a silicon-containing precursor compound (such as a silane, siloxane, or polysiloxane) in an aqueous media to produce a sol-gel of silica. The sol-gel can then be cast into a green body, which is a form of the particle preform in the meaning of the present application. The green body may be partially dried before further processing in subsequent steps (B)-(E).

Particle preforms produced by flame hydrolysis and sol-gel processes may comprise undesirably high amount of OH and OD. Particle preforms produced from sol-gel process may even comprise substantial amounts of $H_2O$ and/or $D_2O$. Particle preforms (typically called soot preforms) produced by flame hydrolysis methods mentioned above (IVD, OVD, VAD, PD) involving the burning of fuels comprising H and/or D ($H_2$, $D_2$, $CH_4$, $CDH_3$, and the like, for example) and/or precursor compounds comprising H and/or D (OMCTS, for example) typically comprise in the soot particles OH and OD groups. For many applications, such amounts of OH and/or OD in the preform would lead to undesirably high level of OH and/or OD in the consolidated glass for the intended purposes. For example, it is understood by the present inventor that low OH/OD glass, such as those comprising a total concentration of OH and OD of less than 500 ppm, in certain embodiments preferably lower than 300 ppm, in certain embodiments preferably lower than about 150 ppm, in certain embodiments preferably lower than about 50 ppm, may be desired for high purity silica glass for use in optical members used in UV and deep UV lithography devices.

For those particle preforms with undesirably high level of $H_2O$, $D_2O$, OH and/or OD, it is desired that before it is further optionally doped with additional dopants, and before it is consolidated into dense glass, it is at least dried to lower the OD and/or OD concentration to a desirable level. In order to control the final OH and/or OD concentration in the consolidated glass, it is desirable in many cases that the particle preform is dried to have a total concentration of OH and/or OD below about 50 ppm by weight, in certain embodiments preferably below about 10 ppm, in certain other embodiments preferably below about 1 ppm, in certain other embodiments preferably below about 0.01 ppm. Where a particle preform comprises below about 1 ppm by weight of total OH and/or OD, the particle preform is considered essentially dry for the purpose of the present application.

Drying agents such as dry inert gas, including but not limited to He, Ar, $N_2$, and the like, may be used to reduce the $H_2O$, $D_2O$, OH and/or OD in the particle preform, at an elevated temperature, such as higher than 500° C., in certain embodiments higher than about 800° C. CO, $CO_2$, and the like, may be used as drying agent as well. CO may react with silica particles to produce defects in the glass. Such defects may be healed as described infra. Preferred drying agents are $F_2$, $Cl_2$, $Br_2$, halogen compound, CO, $CO_2$, and compatible mixtures thereof. The halogen compound is preferably selected from HX, $COX_2$, $SOX_2$, $CX_4$ and $SX_6$, where X is selected from F, Cl, Br and combination thereof. The most preferred drying agent is $Cl_2$ and $Br_2$, without or including CO and mixtures thereof.

The particle preform as provided in step (A) may contain contaminants, especially detrimental metal ions, at unacceptably high amounts. This is especially true if sol-gel process is used in producing the particle preforms. Particle preforms produced by sol-gel processes typically contain high levels of Fe, Na, and the like, which are detrimental to the optical performance of the glass in deep UV and vacuum UV spectra. Once the glass is consolidated and the contaminants are incorporated into the consolidated into the glass, their removal becomes difficult. Therefore, it is highly desirable that prior to consolidation, where necessary, the particle preform is subjected to purification such that contaminant concentrations are reduced to a desired level prior to consolidation of the preform.

Many of the drying agents for removing $H_2O$, $D_2O$, OD and/or OH from the particle preform have contaminant stripping function as well. Those drying agents, when used in the drying process, may function to purify the particle preform simultaneously. Therefore, drying and purifying may advantageously be carried out at the same time, or if desired, different agents may be used to achieve these two different functions. Preferred purifying agents include, but are not limited to, $Cl_2$, $F_2$, Br, a halogen-containing compound, CO, $CO_2$, and the like, and mixtures and combinations thereof. The halogen-containing compound may be HX, $COX_2$, $SOX_2$, $CX_4$ and $SX_6$, and the like, where X is selected from F, Cl, Br and combination thereof. The most preferred drying agent are $Cl_2$ and $Br_2$, with or without CO, and compatible mixtures thereof.

The particle preform may be further doped in step (C) prior to consolidation in step (D). It is also generally understood that doping dopants into consolidated glass is difficult, while doping particle preforms can be carried out in a controlled manner. Thus, the particle preform, with or without the drying/purifying step (B), may be further doped with dopants such as OD, OH, F, Cl, and the like. Doping at elevated temperature such as higher than 500° C., in certain embodiments higher than about 800° C., is desirable in order to expedite the doping process. By controlling the doping temperature, the concentration of the dopants in the doping atmosphere, and doping time, one can control the final concentration of the desired dopants in the particle preform, hence the concentration of the desired dopants in the final consolidated glass. To dope the particle preform with F, F-containing compounds such as HF, DF, $COF_2$, $SOF_2$, $SiF_4$, $CF_4$ and $SF_6$ may be used. Therefore, during the drying and/or purifying step (B), the doping of F may be carried out. To dope the particle preform with Cl, $Cl_2$ and Cl-containing compounds such as HCl, $COCl_2$, $SOCl_2$ and $CCl_4$ may be used. Therefore, during the drying and/or purifying step (B), the doping of Cl may be carried out. Thus steps (B) and (C) may be carried out at least partially simultaneously.

For the purpose of the present invention, controlling the concentration of OH and/or OD in the consolidated glass is highly desirable for many applications, as mentioned supra. This can be desirably done in steps (B) and/or (C). For example, in step (B), the particle preform can be dried and purified to a level essentially free of OH and/or OD. Subsequently, in step (C), the dried particle preform is controllably doped with OH and/or OD to a desirable level so that the final consolidated OD-doped glass has the desired OD and/or OH concentrations. Doping is desirably effected at an elevated temperature such as higher than 500° C., in certain embodiments higher than about 800° C. By choosing the proper doping time, doping temperature, concentration of dopants in the doping atmosphere, one can not only control the final concentrations of OD and/or OH, and other dopants, but also achieve a homogeneous distribution thereof, in the consolidated glass. To dope the particle preform with OD and/or OH, OD-containing and/or OH-containing compounds may be used at various partial pressures in the doping atmosphere. For example, to dope the particle preforms with OD, the doping atmosphere may comprise $D_2$, HD, $D_2O$, $CH_3OD$, $C_2H_5OD$, $CH_3COOD$, and other OD-containing compounds. When $D_2$ and/or HD are present in the doping atmosphere, they may react with the $SiO_2$ glass to produce Si—OD and/or Si—OH in the glass. To dope the particle preforms with OH, the doping atmosphere may comprise $H_2$, HD, $H_2O$, $CH_3OH$, $C_2H_5OH$, $CH_3COOH$, and other OH-containing compounds. Similarly, when $H_2$ and/or HD are present in the doping atmosphere, they may react with the $SiO_2$ glass to produce Si—OH and/or Si—OD in the glass. It is known that reaction between hydrogen gas ($D_2$, DH and/or $H_2$) and $SiO_2$ can lead to the formation of oxygen-deficient sites in the silica glass. Thus, as described infra, it is desired that the particle preform is treated in an oxidizing atmosphere to heal the defects before or during consolidation of the particle preform into dense glass if hydrogen gas is used as a doping agent in the doping atmosphere. If $D_2O$ and/or $H_2O$ are used as the doping agent in the doping atmosphere, they may be fed as they are into the doping environment, or formed in situ by, e.g., reactions between $D_2/H_2$ and $O_2$ fed into the environment separately. To achieve the desired [OD]/[OH] ratio in the final consolidated glass, in the doping step (C), the doping atmosphere may be adjusted to contain the OD-containing and OH-containing compounds having the desired partial pressures thereof. The most preferred OD-doping agent for the particle preform is $D_2O$. $D_2O$ at higher than 99.9% by mole of isotopic purity is commercially available. The most preferred OH-doping agent for the particle preform is $H_2O$. When doping essentially dry particle preform, the doping atmosphere may be adjusted to have the desired $D_2O$ and $H_2O$ partial pressures to obtain the desired [OD] and [OH] concentration in the final glass. When doing particle preforms comprising OH at a certain level with OD, the particle preform may be treated in a doping atmosphere comprising a D-containing compound, such as an OD-containing compound, such as $D_2O$, for a sufficient time, such that a desirable amount of OH in the particle preform is exchanged by OD. By controlling the partial pressure ratio of the OD-containing and OH-containing compounds in the doping atmosphere, doping temperature and doping time, glass with desired levels of [OD] and [OH] can be obtained in this manner as well. It is not ruled out that the particle preform may comprise certain amount of OD before step (C), and in step (C), it is doped or exchanged with OH only to achieve the desired [OD] and [OH] concentrations in the final glass. Ratio of n(OD)/(n (OD)+n(OH)) in the particle preform higher than about 0.02, in certain embodiments higher than about 0.05, in certain other embodiments higher than about 0.1, in certain other embodiments higher than about 0.3, in certain other embodiments higher than about 0.5, in certain other embodiments higher than about 0.9, in certain other embodiments higher than about 0.95, can be achieved.

The doping atmosphere may comprise, in addition to doping compounds, $O_2$, and inert gases. Since doping of OH and OD is usually carried out at elevated temperature such as higher than about 500° C., in certain embodiments higher than about 800° C., $H_2$, $D_2$, HD, $O_2$, $H_2O$ and $D_2O$ exist at amounts typically determined by chemical equilibrium and dynamic factors. Steps (B) and/or (C) may be carried out in the presence of other reductive gases than $H_2$ and $D_2$, such as hydrocarbons, D-containing hydrocarbons, and the like.

It is known that when particle preforms comprising silica is treated in a reductive atmosphere at an elevated temperature such as in steps (B) and/or (C), oxygen-deficient defects in the glass may be generated. Such defects are particularly detrimental for transmission properties in deep UV and vacuum UV, such as at about 248 nm and 193 nm. Therefore, after steps (B) and (C), it is highly desirable that the particle preform is treated in an oxidative atmosphere in a step (C(A)). The oxidation agent in the oxidative atmosphere may be, for example, $O_2$, $O_3$, $D_2O$, $H_2O$, and the like.

In step (D) of the process of the present invention, the particle preform is consolidated into dense silica glass. Steps (C) and (D) may be carried out at least partially simultaneously, meaning that, at least part of the doping is carried out while the particle preform is consolidated into dense glass. Step (C(A)) described above and step (D) may be carried out at least partly simultaneously, meaning that, at least in part of step (D), at least part of the oxygen-deficient defects in the glass is oxidized and healed. In step (D), the particle preform is heated to an elevated temperature, desirably higher than 1000° C., in certain embodiments higher than 1200° C., in certain embodiments higher than about 1400° C., where the particles are sintered into dense glass. Temperature elevation rate during consolidation step (D) may be controlled in a manner such that a homogeneous distribution of dopants such as OH, OD, F and the like is achieved. Step (D) may be conducted in a consolidation atmosphere comprising inert gas such as He, Ar, $N_2$, and the like. The consolidation atmosphere may further comprise $O_2$ and/or $D_2O$ and/or $H_2O$ at a desired level. The $O_2$, $D_2O$ and/or $H_2O$ can function to oxidize and heal the oxygen-deficient sites in the glass. Where high [OD] glass is desired, the consolidation atmosphere may be essentially devoid of $H_2O$ and HDO. The consolidation atmosphere may further comprise $H_2$, $D_2$, HD, and the like. However, as mentioned above, reaction between such reductive gases with silica glass at elevated temperature can lead to the formation of defects in the glass. It is believed by the present inventors that glasses with high [OH] and/or [OD] tend to have less defects than glasses with lower [OH] and [OD] when treated in a reductive atmosphere at high temperature, such as an atmosphere comprising $H_2$, HD and/or $D_2$.

Step (E) of this process of the present invention involves hydrogen doping the consolidated glass with a hydrogen doping atmosphere comprising molecular $H_2$, HD and/or $D_2$. The hydrogen doping atmosphere may comprise essentially no $D_2$ and HD even for glasses doped with high percentages of OD, especially if the hydrogen loading temperature is relatively low, such as below about 500° C. In certain embodiments it is desired that for glasses doped with high percentage of OD, the hydrogen doping atmosphere is essentially devoid of HD and $H_2$ where the hydrogen doping temperature is higher than 500° C. Nonetheless, it has been found that where the silica glass is loaded at a temperature below about 500° C., the loading of $H_2$ or $D_2$ does not appreciably alter the [OH] and [OD] in the glass. The hydrogen doping may be advantageously carried out at a temperature below about 600° C. (cold loading), or to expedite the process, at a temperature above about 600° C. (hot loading). However, it is usually conducted at a temperature below 1000° C. Due to the laws of diffusion, to reach the same loaded hydrogen level in the glass, cold loading tends to take longer time. Nonetheless, cold loading is preferred for the production of certain silica glass, especially those with relatively low water (e.g., [OD]+ [OH]<100 ppm) for use in refractive lens elements in deep UV and vacuum UV lithographic devices, because it tends to generate less defects in the consolidated glass.

As mentioned supra, it was stated in the copending, co-assigned patent application Ser. No. 11/241,075 (filed on Sep. 30, 2005 and entitled "SYNTHETIC SILICA HAVING LOW POLARIZATION-INDUCED BIREFRINGENCE, METHOD OF MAKING SAME AND LITHOGRAPHIC DEVICE COMPRISING SAME," now published as U.S. patent application Publication No. 2006-0137399 A1, the relevant part thereof is incorporated herein by reference) that non-OD-doped silica glass tends to have worse polarization-induced birefringence performance at higher [OH]. It was also stated in this patent application that the amount of polarization-induced birefringence was approximately proportional to the [OH] in an OH-doped silica glass. Therefore, for the sake of acceptable polarization-induced birefringence performance, for non-OD-doped synthetic silica glass, it is generally preferred that it has an [OH] of less than 500 ppm, in certain embodiments preferably less than 160 ppm, in certain other embodiments less than 50 ppm. However, in a totally unexpected manner, the present inventors have found that [OD]-doped silica glass, especially those essentially free of OH, tends to have much lower polarization-induced birefringence value compared to non-OD-doped silica glass with comparable [OH]. In certain OD-doped glass samples essentially devoid of OH, the polarization-induced birefringence was discovered to be essentially zero when exposed to 193 nm pulses of linearly polarized excimer laser beam at about 200 $\mu J \cdot cm^{-2} \cdot pulse^{-1}$ even after 8 billion pulses. Therefore, the present inventors expect that the OD-doped high purity synthetic silica glass of the present invention, especially those essentially devoid of OH will exhibit very low polarization-induced birefringence even with a high [OD] up to or exceeding 1000 ppm.

In another co-pending, co-assigned patent application Ser. No. 11/261,005 (filed on Oct. 26, 2005 and entitled "SYNTHETIC SILICA WITH LOW FLUENCE-DEPENDENT-TRANSMISSION AND METHOD OF MAKING THE SAME," the relevant portion thereof is incorporated herein by reference), it was found that for non-OD-doped high purity synthetic silica glass, from the standpoint of fluence-dependent-transmission ("FDT") and LIWFD, it is preferable that for those with [OH]≦160 ppm, $H_2$ loading should be conducted at lower than about 600° C. It was shown that hot loading can cause deterioration in FDT and LIWFD in such OH-doped silica glass with [OH]≦160 ppm. Yet, it was also shown that for those with [OH]≧500 ppm, hot loading does not alter the FDT and LIWFD performance more appreciably than cold loading.

Therefore, the present inventors expect that the OD-doped synthetic silica glass of the present invention, especially those with essentially no OH, even with [OD] up to or exceeding 1000 ppm, can be hot loaded with hydrogen to result in glass with acceptable polarization-induced birefringence performance and without compromising the FDT and LIWFD properties. Therefore, high [OD] silica glass, at least those essentially free of OH, may be useable in applications where non-OD-doped silica glasses with comparable [OH] cannot be used. These high [OD] glasses can be produced with much higher efficiency and speed because it can be hot loaded, compared to the non-OD-doped, low [OH] glasses, which are typically required to be cold loaded.

Another method of making the OD-doped synthetic silica glass of the present invention includes the following steps:

(a) providing a plurality of OD-doped particles comprising silica; and (b) melting the particles at an elevated temperature to obtain a transparent glass.

Step (a) in this process may comprise the following steps:

(a1) generating a plurality of particles comprising silica;

(a2) optionally purifying and/or drying the particles;

(a3) optionally doping the particles in an atmosphere comprising at least one D-containing compound, and (a4) optionally treating the particles in an oxidative atmosphere to at least partly heal oxygen-deficient sites in the particles.

wherein at least in one of steps (a1), (a2), (a3) and (a4), OD moieties are introduced into the particles.

In step (a1), the particles comprising silica may be generated by flame hydrolysis or sol-gel processes as described above in connection with the particle-to-glass process wherein the particle preforms are finally consolidated instead of melted to form the glass.

In step (a2), the purifying and/or drying may be carried out mutatis mutandis as described above in connection with the particle-to-glass process wherein the particle preforms are finally consolidated instead of melted to form the glass. Low level of metal impurities can be obtained via high purity starting materials and apparatus for making the soot (and corresponding consolidated glass) and/or purifying the soot (and apparatus used to consolidate the soot) with, e.g., $Cl_2$ or $Cl_2+CO$, to remove trace metals.

In step (a3), the doping may be carried out mutatis mutandis as described above in connection with the particle-to-glass process wherein the particle preforms are finally consolidated instead of melted to form the glass.

In step (a4), the treatment may be carried out mutatis mutandis as described above in connection with the particle-to-glass process wherein the particle preforms are finally consolidated instead of melted to form the glass.

In step (b), the glass is heated to a temperature where the glass is melted, such as at a temperature higher than 1500° C., in certain embodiments above 1800° C., in certain embodiments about 2000° C. The melted glass may be further homogenized when melted in order to obtain a high homogeneity of composition and property in the final glass. Where homogenization is carried out, the glass particles melted may have essentially the same composition or differing compositions. For example, the particles may be an admixture of particles having differing [OH] and [OD]. Upon homogenization, the final glass obtained has a uniform [OH] and/or [OD].

Homogenization of consolidated glass can be carried out as well. Thus the consolidated OD-doped synthetic silica glass of the present invention or mixtures thereof, irrespective of the method of making, may be heated to an elevated temperature, such as above 1500° C., in certain embodiments above 1800° C., where they are melted and homogenized to form a glass with uniform composition and properties.

Upon homogenization, the final, cooled, consolidated glass may be further doped with molecular hydrogen as described above in connection with the particle-to-glass process wherein the particle preforms are finally consolidated instead of melted to form the glass, mutatis mutandis.

It is possible to make OD-doped silica glass material of the present invention by H/D exchanging a consolidated, dense silica glass comprising OH and/or OD in an atmosphere comprising $H_2$, $D_2$ and/or HD at an elevated temperature, e.g., higher than 600° C., in certain embodiments higher than about 800° C., in certain embodiments as high as 1000° C., to achieve the desired level of n(OD)/(n(OD)+n(OH)) in the dense glass. The dense glass may be made of direct-to-glass processes, or may be made of soot-to-glass or sol gel processes mentioned supra. For a dense glass comprising essentially no OD, such as an OH-doped glass made of traditional direct-to-glass process in non-D-containing environment starting from a non-D-containing materials (e.g., typical Corning HPFS® glass code 7980™, made by Corning Incorporated, Corning, N.Y., which comprises about 1000 ppm by weight of OH and essentially no OD), OD-doped glass at various n(OD)/(n(OD)+n(OH)) can be made by $D_2$-loading the glass at an elevated temperature, such as about 900° C., for a sufficient period of time. Glasses with very low [OH], such as n(OD)/(n(OD)+n(OH)) higher than 0.5, in certain embodiments higher than about 0.8, in certain embodiments higher than about 0.9, can be successfully made.

The synthetic silica glass material of the present invention can be further processed into optical members for use in the light path of lithographic irradiation of a lithographic device operating at a wavelength of below about 300 nm, such as about 248 nm, 193 nm and even shorter. The optical member may take various geometry and size. The optical member may be used in low-fluence or high-fluence irradiation paths. Thus a process for making optical member based on the silica glass of the present invention can be a combination of the processes of the present invention for making the glass material and additional steps of processing the glass material of the present invention. As mentioned supra, whereas OD-doped synthetic silica glass were studied and disclosed previously, to the best knowledge of the present inventors, none of the references discloses OD-doped synthetic silica glass capable of being used in optical members in the irradiation light path of lithographic devices operating at below about 300 nm, much less OD-doped synthetic silica glass having the unexpected optical performances at wavelengths such as about 193 nm. It is believed that the example materials disclosed in the prior art references discussed supra do not have the optical performance of the material of the present invention or the optical performance required for lithographic applications below about 300 nm.

The following non-limiting examples further illustrate the present invention.

EXAMPLES

Example 1a

Figure 6:
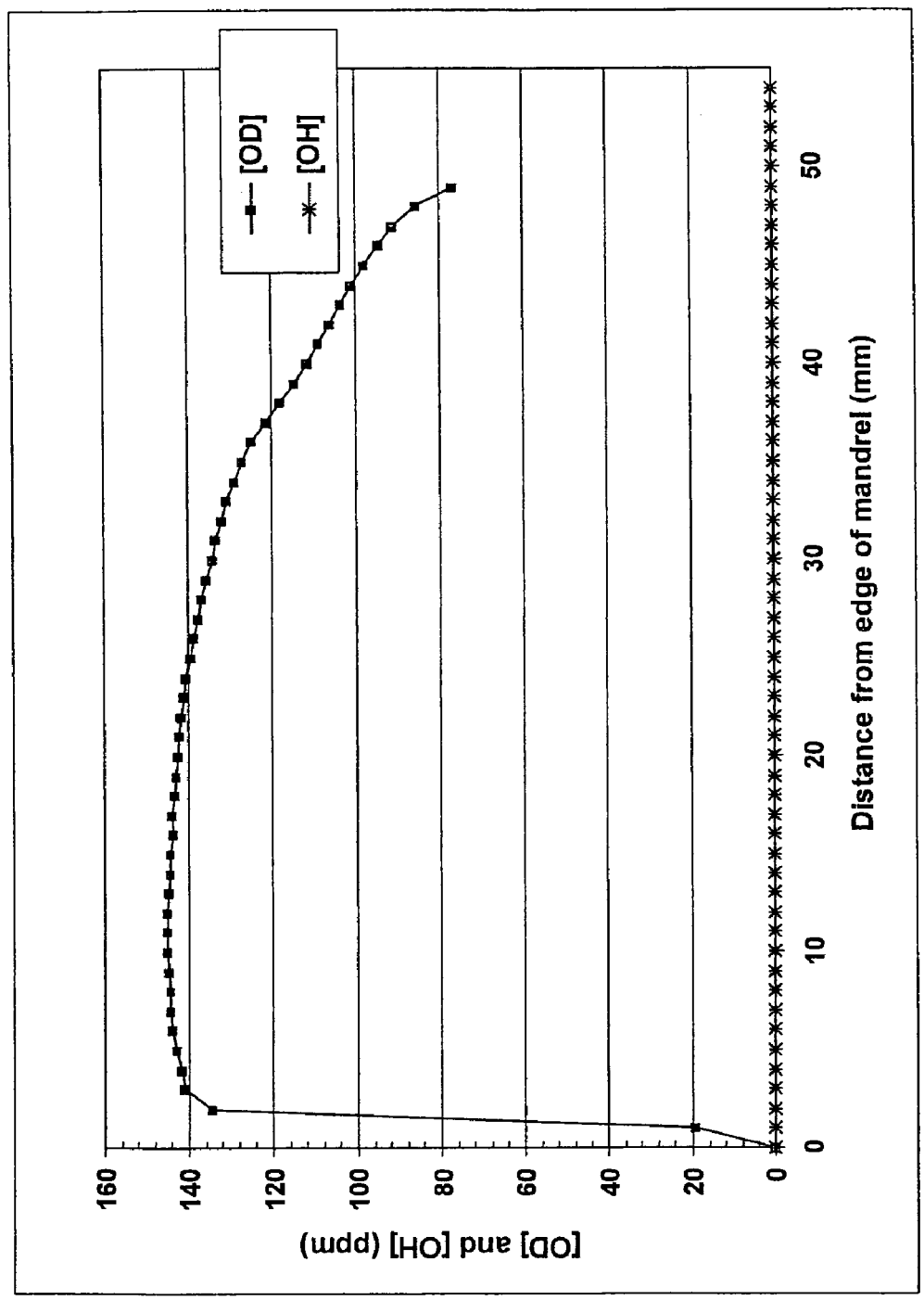
FIG. 6 is a diagram showing the OH concentration ([OH]) and OD concentration ([OD]) profiles of a consolidated silica glass sample produced according to one embodiment of the processes of the present invention for making OD-doped silica glass of the present invention.

In this Example, an OD-doped fused silica glass was made by using the soot-to-glass process as described in co-pending, co-assigned patent application Ser. No. 11/148,764, entitled "HIGH REFRACTIVE INDEX HOMOGENEITY FUSED SILICA GLASS AND METHOD OF MAKING SAME" and filed on Jun. 8, 2005 now published as U. S. patent application Publication No. 2006-0137398 A1, the relevant part of which is incorporated herein by reference. In particular, silica soot preform was formed by depositing a plurality of soot particles obtained by flame hydrolysis of a Si-containing precursor compound, octamethylcyclotetrasiloxane (OMCTS), on the rotating surface of a mandrel. The soot preform thus prepared was OH-doped. The soot preform was subsequently D/H exchanged and OD-doped with 99.9+% isotopic purity $D_2O$ by placing the preform into a consolidation furnace set at approximately 1100° C. and bubbling helium containing 2.5% oxygen through liquid $D_2O$ into the consolidation furnace for 6 hours to obtain the OD-doped soot. The OD-doped soot preform was then sintered to a consolidated OD-doped silica glass in a helium atmosphere containing $D_2O$ by raising the furnace temperature approximately 1400° C. Following consolidation the silica glass was placed in a nitrogen purged holding oven at about 1100° C. for about 24 hours and cooled at less than a 25° C./hr to 850° C. then cooled to room temperature (this silica glass was used for Samples C, D and F in TABLE I). Deuteroxyl-doping was successful, wherein the consolidated glass comprised about 130 ppm by weight of OD and less than 1 ppm of OH. [OD] and [OH] along the radial direction of the glass was measured and presented in FIG. 6. These samples were found to have less than 10 ppb by weight of sodium, less than 10 ppb by weight in total of all alkali metals, less than 10 ppb by weight of alkaline earth metals, and less than 1 ppb by weight of Fe, Cr and Ni.

Example 1b

Figure 12:
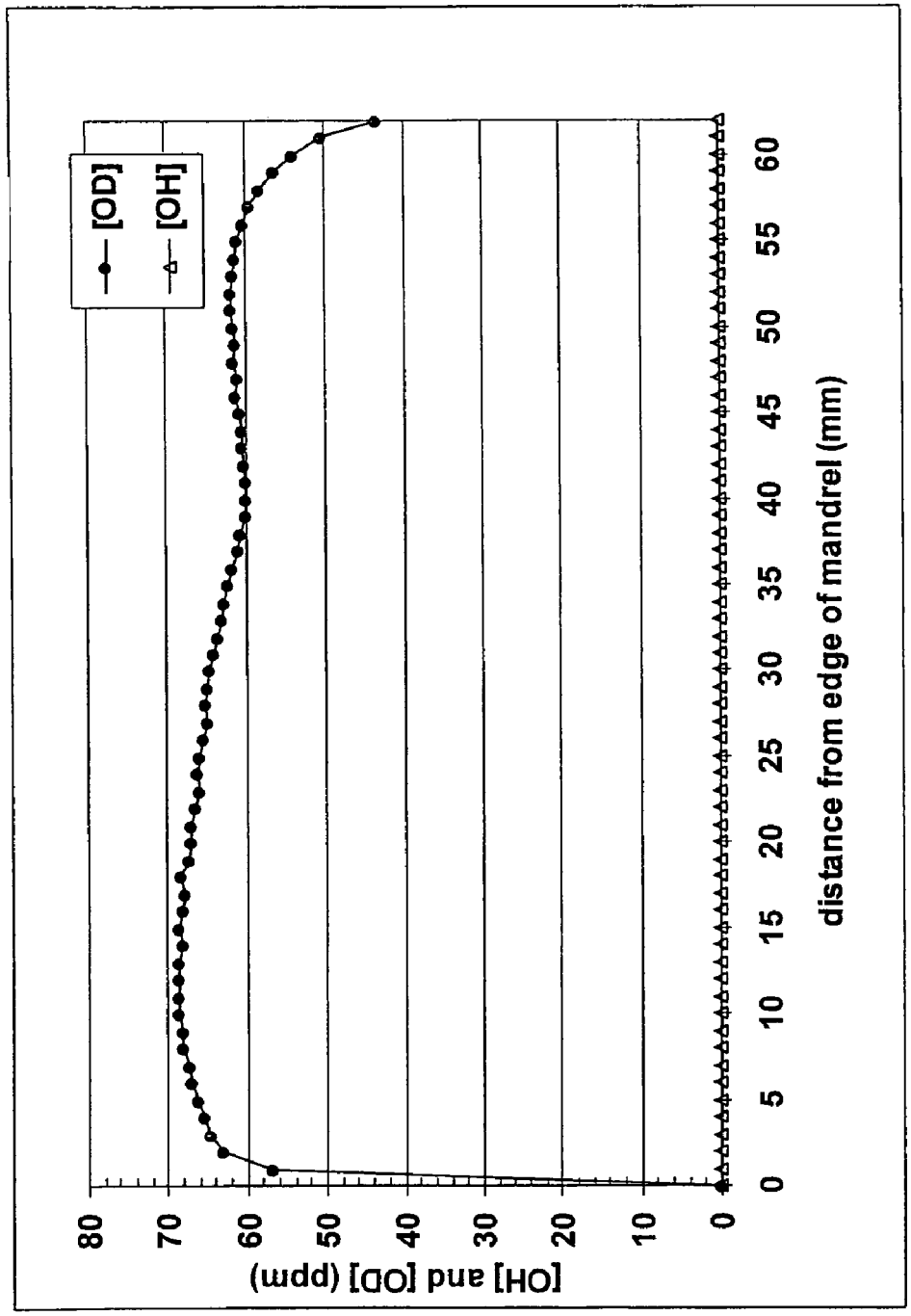
FIG. 12 is the OH concentration ([OH]) and OD concentration ([OD]) profiles of a consolidated silica glass sample produced according to one embodiment of the processes of the present invention for making OD-doped silica glass of the present invention.

In this Example, an OD-doped fused silica glass was made by using the soot-to-glass process as described in Example 1a. The soot preform thus prepared was OH-doped. The soot preform was subsequently D/H exchanged and OD-doped with 99.9+% isotopic purity $D_2O$ by placing the preform into a consolidation furnace set at approximately 1100° C. and bubbling helium containing 2.5% oxygen through liquid $D_2O$ into the consolidation furnace for 6 hours to obtain OD-doped soot. The OD-doped soot preform was then sintered to a consolidated OD-doped silica glass in a helium atmosphere containing $D_2O$ by raising the furnace temperature approximately 1400° C. Following consolidation the silica was placed in a nitrogen purged holding oven at 1100° C. for 24 hours and cooled at less than 25° C./hour to 850° C. then cooled to room temperature (this silica was used for sample H shown in TABLE I). Another sample was then placed in a nitrogen purged holding oven ramped to 1100° C. then cooled at less than 1° C./hour to 800° C. then cooled at less than 25° C./hour to room temperature (this silica was used for sample G shown in TABLE I). Deuteroxyl-doping was successful, wherein the consolidated glass comprised about 70 ppm by weight of OD and less than 1 ppm of OH. [OD] and [OH] along the radial direction of the glass was measured and presented in FIG. 12. The fictive temperature of these materials was measured to be 1126° C. and 1032° C., respectively, for Samples H and G. These samples were found to have less than 10 ppb by weight of sodium, less than 10 ppb by weight in total of all alkali metals, less than 10 ppb by weight of alkaline earth metals, less than 1 ppb by weight of Fe, Cr and Ni.

Example 1c

Figure 17:
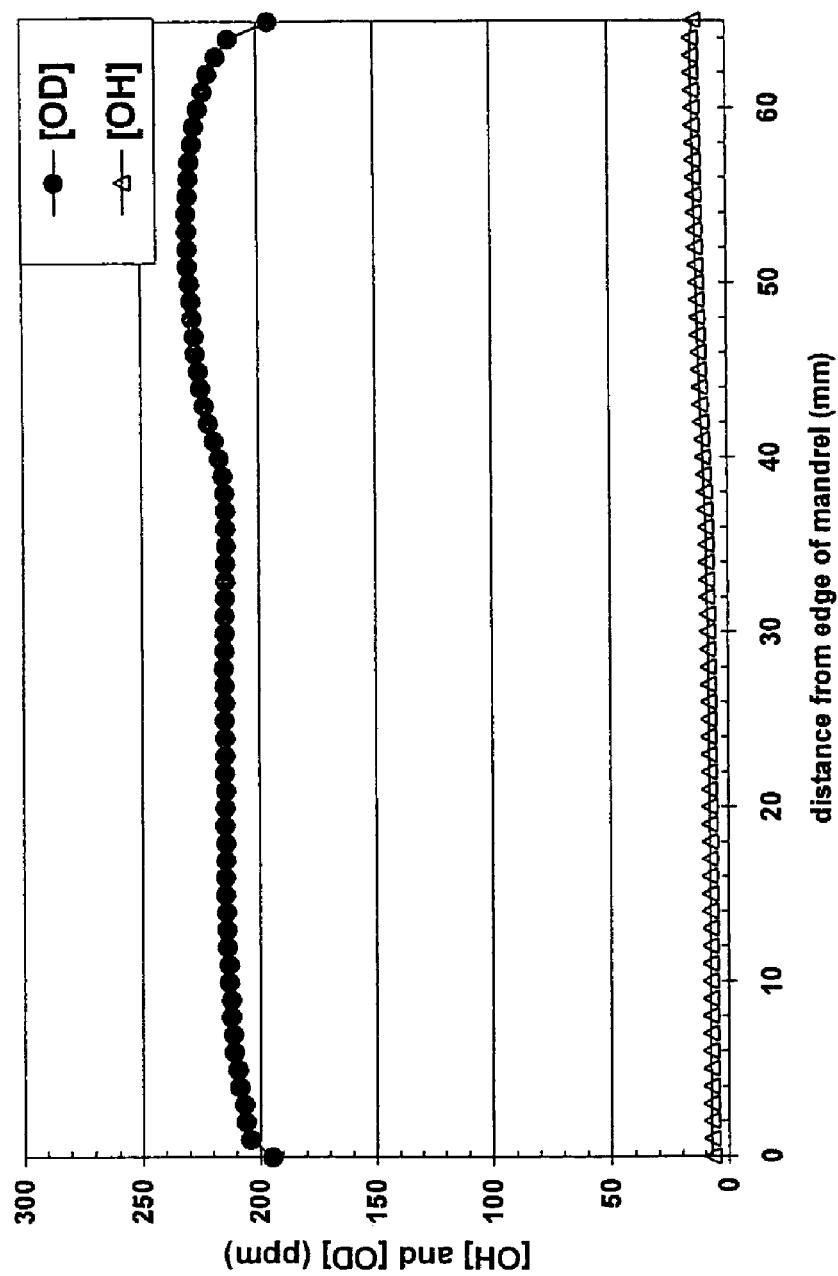
FIG. 17 is a diagram showing the OH concentration ([OH]) and OD concentration ([OD]) profiles of a consolidated silica glass sample produced according to one embodiment of the processes of the present invention for making OD-doped silica glass of the present invention.

In this Example, an OD-doped fused silica glass was made by using the soot-to-glass process as described in Example 1a. The soot preform thus prepared was OH-doped. The soot preform was placed in a consolidation furnace set at 1100° C. and treated for 4 hours flowing helium containing 1.6% by volume $Cl_2$ and 0.3% by volume CO; this process was used to remove all the OH and trace metals from the soot preform. The soot preform was then exposed at 1100° C. for 8 hours to $D_2O$ and $O_2$ by flowing helium containing 2.5% by volume $O_2$ through a $D_2O$ containing bubbler; this process removed all of the chlorine and re-oxidized any reduced silica from the previous step. This produced OD-doped soot preform. The soot preform was then sintered to a consolidated OD-doped silica glass in a helium atmosphere containing $D_2O$ by raising the furnace temperature approximately 1400° C. Following consolidation the OD-doped silica was placed in a nitrogen purged holding oven at 1100° C. for 24 hours and cooled at less than 25° C./hour to 850° C. then cooled to room temperature. Deuteroxyl-doping was successful, wherein the consolidated glass comprised about 220 ppm by weight of OD and about 8 ppm of OH. [OD] and [OH] along the radial direction of the glass was measured and presented in FIG. 17. Samples of this OD-doped silica glass were post-loaded with $H_2$ to about $3 \times 10^{16}$ molecules/$cm^3$ at 425° C. The fictive temperature of this material was measured to be 1085° C. This sample had an internal transmission at 193 nm of 99.66%/cm. This sample had less than 10 ppm by weight of Cl, less than 10 ppb by weight of sodium, less than 10 ppb by weight of total alkali metals, less than 10 ppb by weight of total alkaline earth elements, and less than 1 ppb by weight of iron, chromium or nickel.

Example 2

Figure 7:
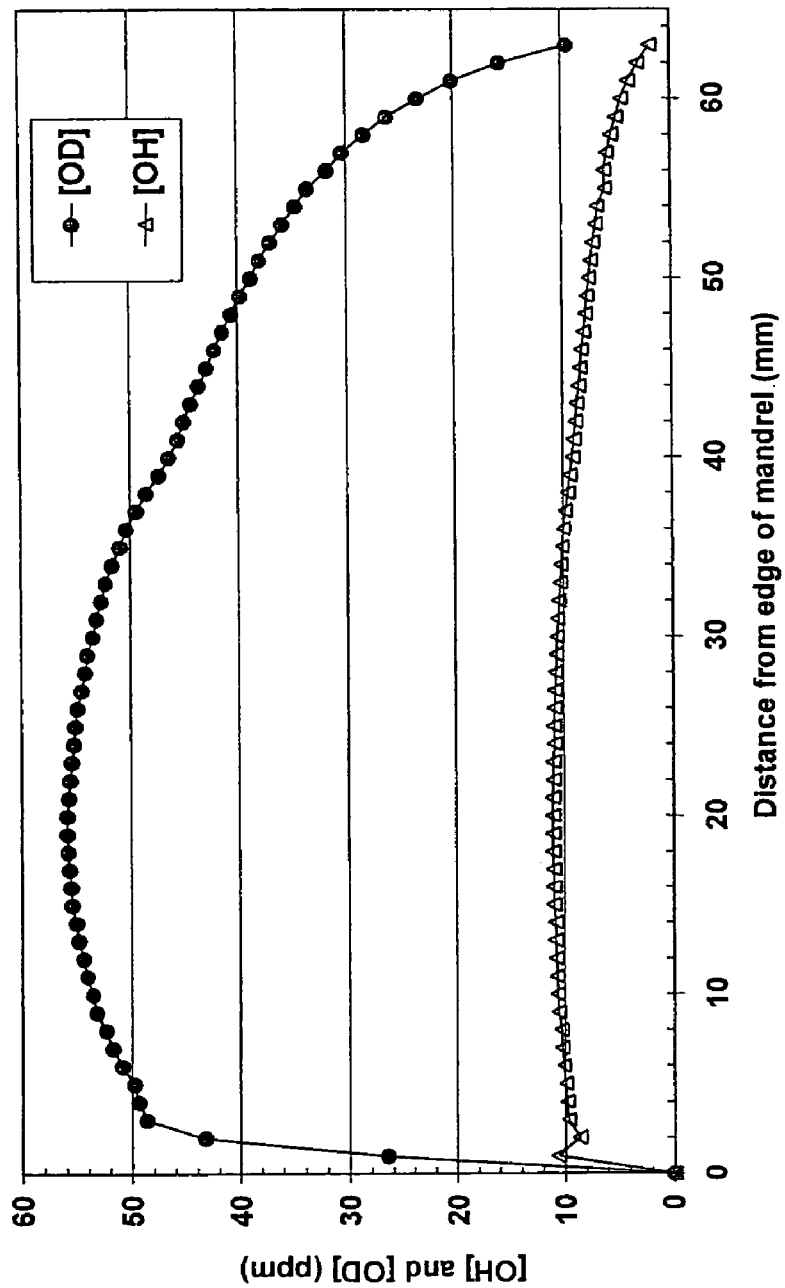
FIG. 7 is a diagram showing the [OH] and [OD] profiles of a consolidated OD-doped silica glass prepared according to one embodiment of the process of the present invention for making OD-doped silica glass of the present invention.

In this Example, an OD-doped fused silica glass was made by using the soot-to-glass process as described in co-pending, co-assigned patent application Ser. No. 11/148,764 (U.S. patent application Publication No. 2006-0137398 A1). In particular, silica soot preform was formed by depositing a plurality of soot particles obtained by flame hydrolysis of a Si-containing precursor compound on the rotating surface of a mandrel. The soot preform thus prepared was OH-doped. The soot preform was subsequently partially D/H exchanged and OD-doped with 99.9+% isotopic purity $D_2O$ by bubbling helium through liquid $D_2O$ into the consolidation furnace during the consolidation process in a manner similar to the described in Example 1a. Deuteroxyl-doping was successful, wherein the consolidated glass comprised about 40-50 ppm by weight of OD and about 10 ppm of OH. [OD] and [OH] along the radial direction of the glass were measured and presented in FIG. 7. It is interesting to note that at different locations in the radial direction, both [OD] and [OH] vary, yet the ratio of [OD]/[OH] remains essentially constant. This indicates that the OH groups in the soot preform were exchanged to OD groups at essentially the same proportion.

Example 3

All samples of OH-doped silica glass and OD-doped silica glass were annealed in a manner similar to that described in Example 1b prior to $H_2$ or $D_2$ loading and the corresponding fictive temperature for each sample, measured after $H_2$ or $D_2$ loading, is shown in TABLE I. Samples of the OD-doped silica glass of Examples 1a, 1b and 1c were post-loaded with $H_2$ or $D_2$ to about $4\times10^{16}$ molecules/cm$^3$ at 375° C. OH-doped glasses prepared by using the soot-to-glass process as described in co-pending, co-assigned patent application Ser. No. 11/148,764 (U.S. patent application Publication No. 2006-0137398) were loaded with $H_2$ or $D_2$ to about $4\times10^{16}$ or $6\times10^{16}$ molecules/cm$^3$ at 375° C. FTIR results showed that the [OH] and [OD] levels in the glasses were not changed by the $H_2$ or $D_2$ loading process. The glasses were exposed to linearly polarized 193 nm ArF excimer laser having a repetition rate of 4 kHz, a fluence of 200 µJ·cm$^{-2}$·pulse·$^{-1}$ and a pulse length of 25 ns for multiple millions of pulses. The exposed samples were then characterized of polarization-induced birefringence, normalized polarization-induced birefringence (PIB(N)), normalized LIWFD measured at 193 nm (L193) and normalized LIWFD measured at 633 nm (L633) and normalized induced absorption (IA(N)). Data are presented in FIGS. 8, 9, 10, 11, 12, 13, 14, 15 and 16, respectively. Samples A, B, C, D, E, F, G, H, J, K and L were found to comprise less than 10 ppb by weight of sodium, less than 10 ppb by weight in total of alkali metals, less than 10 ppb by weight in total of alkaline earth metals, and less than 1 ppb by weight of Fe, Cr or Ni. Samples A, B, C, D, F and H had internal transmission at 193 nm of about 99.78%/cm; Samples E, G, H, K and L were found to have internal transmission of about 99.74%/cm; and Sample J was found to have an internal transmission at 193 nm of about 99.70%/cm. Samples A, B, C, D, E, F, G, H, J, K and L have the compositions as listed in TABLE I below:

TABLE I

| Sample | [OH] (ppm) | [OD] (ppm) | [H$_2$] (×10$^{17}$ molecule/cm$^3$) | [D$_2$] (×10$^{17}$ molecule/cm$^3$) | T$_f$ (° C.) | Fluence (mJ·cm$^{-2}$·pulse$^{-1}$) |
|---|---|---|---|---|---|---|
| A | 105 | ND | 0.4 | ND | 1056 | 0.2 |
| B | 105 | ND | ND | 0.4 | 1056 | 0.2 |
| C | ND | 130 | 0.4 | ND | 1109 | 0.2 |
| D | ND | 130 | ND | 0.4 | 1109 | 0.2 |
| E | 60 | ND | 0.6 | ND | 1066 | 0.2 |
| F | ND | 130 | 0.4 | ND | 1109 | 0.6 |
| G | ND | 70 | 0.8 | ND | 1032 | 0.6 |
| H | ND | 69 | 0.7 | ND | 1126 | 0.6 |
| J | 57 | ND | 0.7 | ND | 1029 | 0.6 |
| K | 56 | ND | 0.7 | ND | 1101 | 0.6 |
| L | 60 | ND | 0.6 | ND | 1066 | 0.2 |

ND: Not detected

Figure 8:
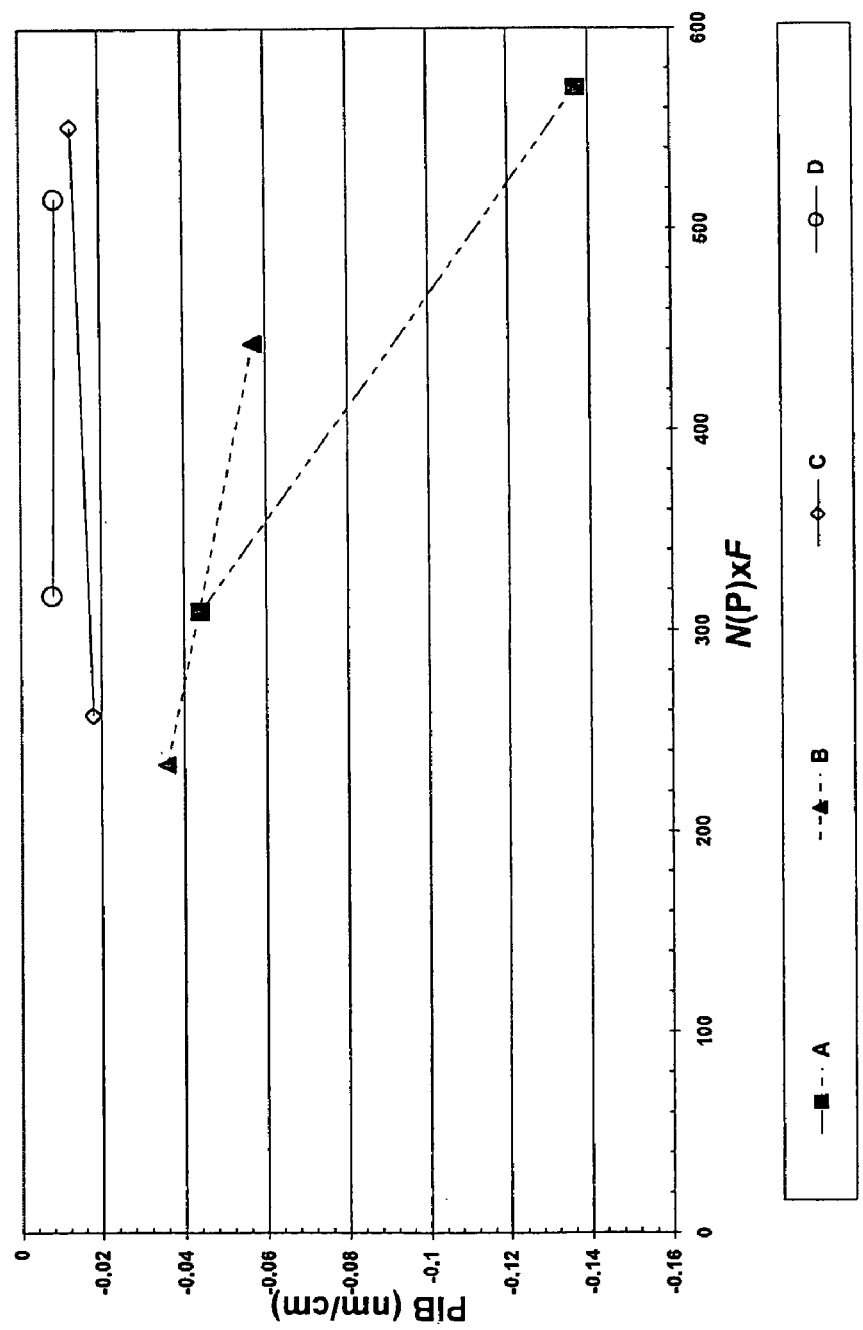
FIG. 8 is a diagram showing polarization-induced birefringence, measured at 633 nm, of a series of OD-doped silica glass samples of the present invention, and a series of OH-doped silica glass samples, having various levels of molecular $H_2$ or $D_2$, as a function of N(P)·F, where F is fluence, and N(P) is number of pulses of a pulsed laser beam having a wavelength of about 193 nm, a fluence of about 200 $\mu J \cdot cm^{-2} \cdot pulse^{-1}$ and a pulse length of approximately 25 ns and a repetition rate of about 4 kHz to which the glass samples were exposed.
Figure 9:
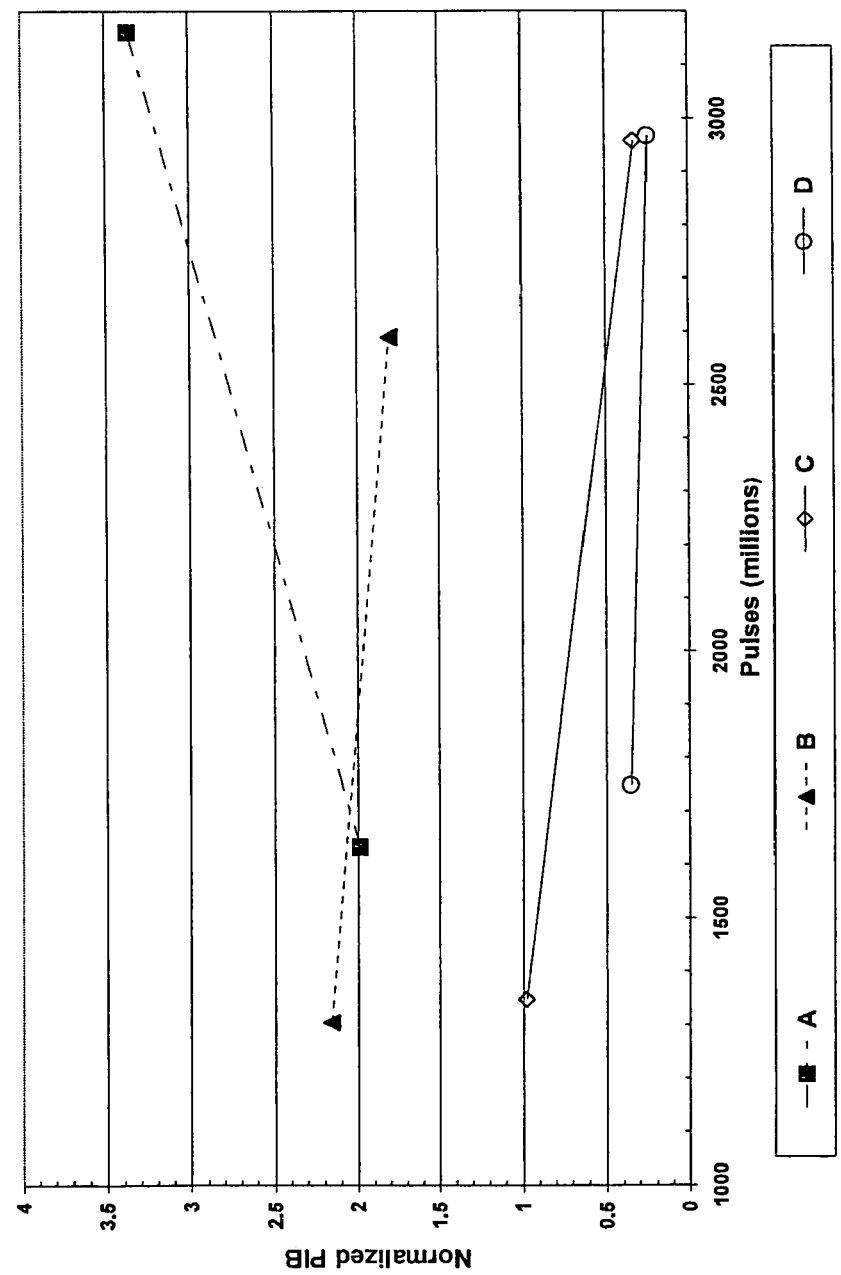
FIG. 9 is a diagram showing normalized polarization-induced birefringence of the same samples of FIG. 8, as a function of number of pulses of a pulsed laser beam having a wavelength of about 193 nm, a fluence of about 200 $\mu J \cdot cm^{-2} \cdot pulse^{-1}$ and a pulse length of approximately 25 ns and a repetition rate of about 4 kHz to which the glass samples were exposed.
Figure 13:
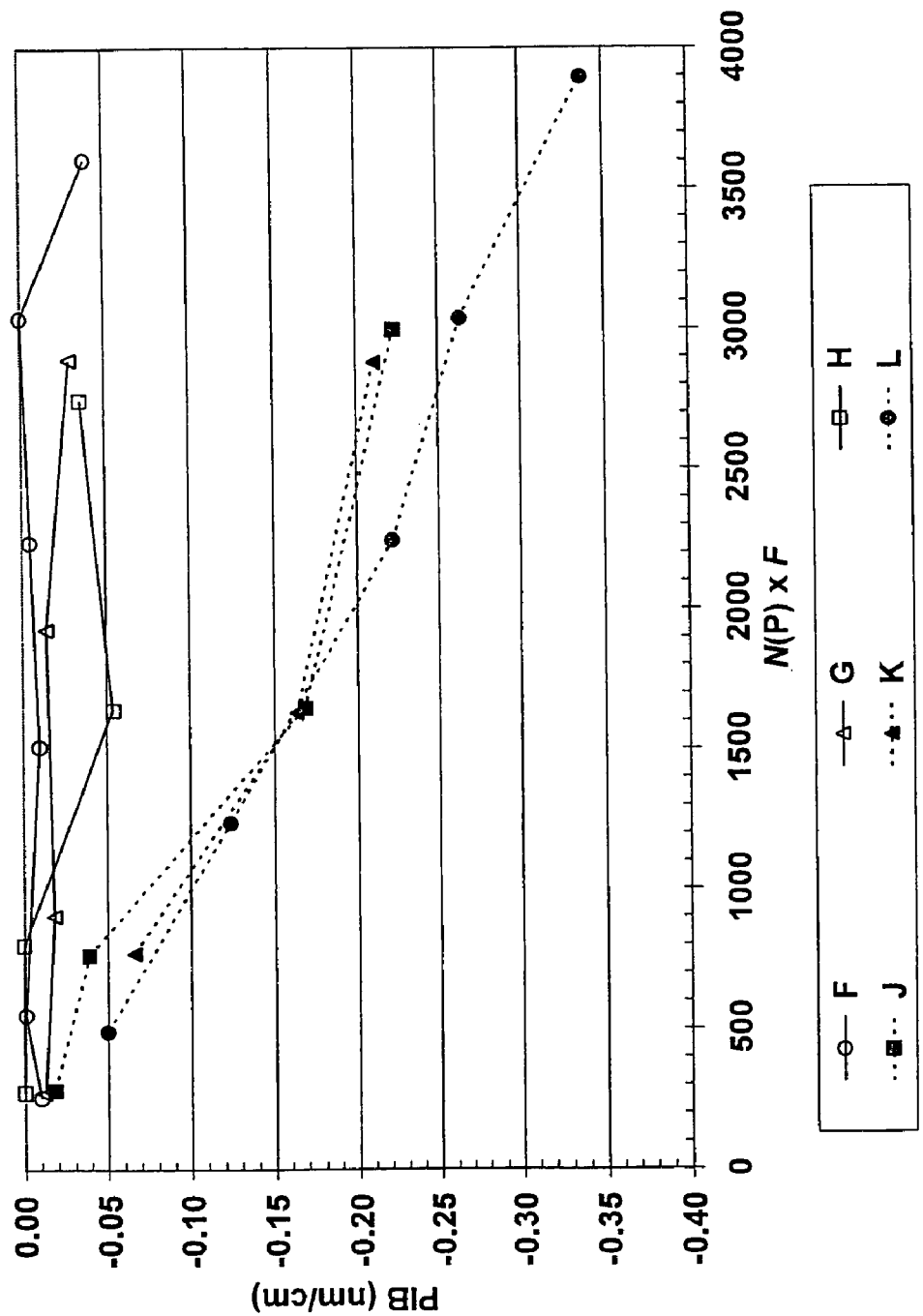
FIG. 13 is a diagram showing polarization-induced birefringence, measured at 633 nm, of a series of OD-doped silica glass samples of the present invention, and a series of OH-doped silica glass samples, having various levels of molecular $H_2$, as a function of number of pulses of a pulsed laser beam having a wavelength of about 193 nm, a fluence of 600 $\mu J \cdot cm^{-2} \cdot pulse^{-1}$ and a pulse length of approximately 21 ns and a repetition rate of about 4 kHz to which the glass samples G, H, J and K were exposed, and a fluence of 200 $\mu J \cdot cm^{-2} \cdot pulse^{-1}$ and a pulse length of approximately 25 ns and a repetition rate of about 4 kHz to which the glass samples F and L were exposed.
Figure 14:
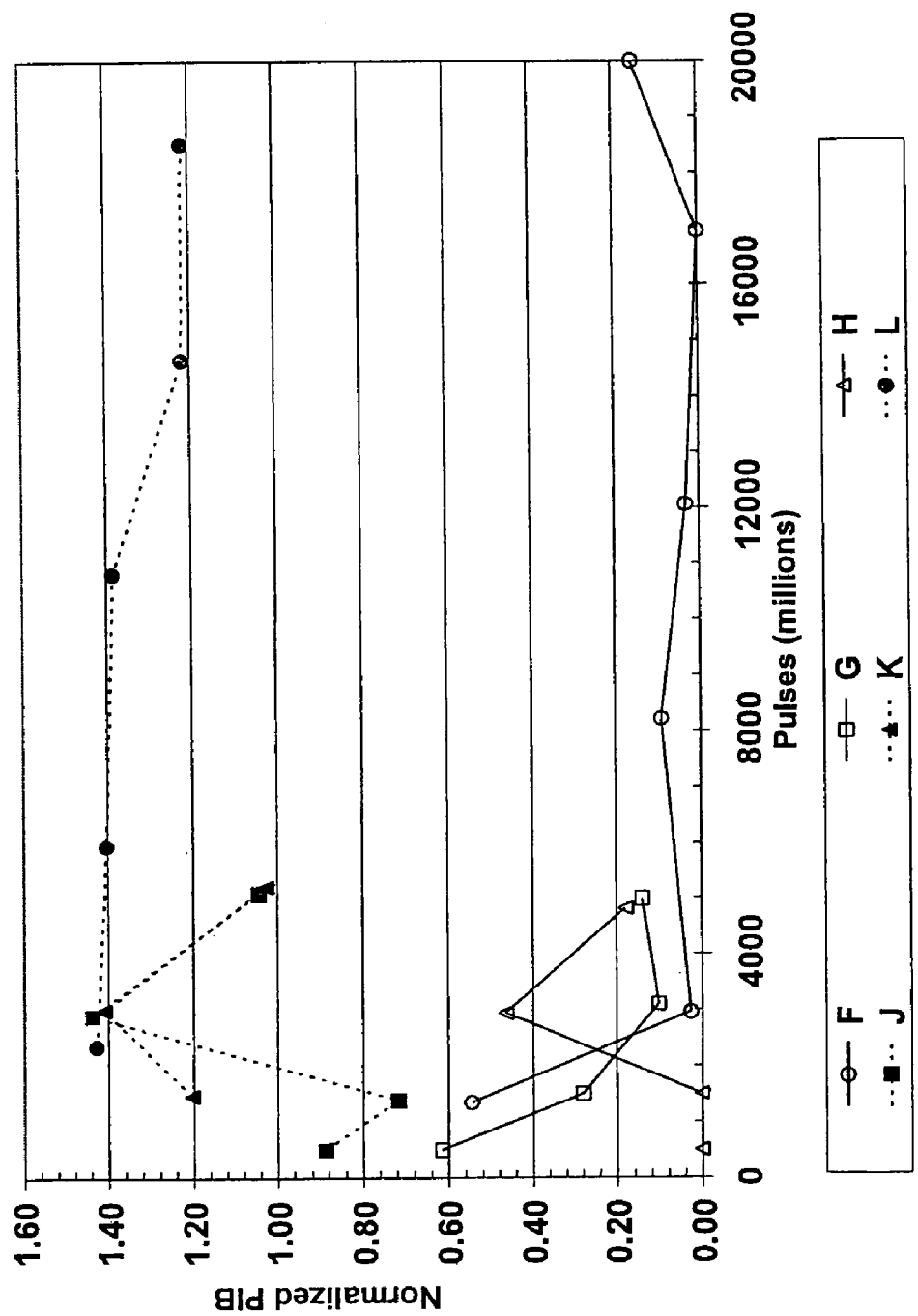
FIG. 14 is a diagram showing normalized polarization-induced birefringence of a series of OD-doped silica glass samples of the present invention, and a series of OH-doped silica glass samples, having various levels of molecular $H_2$, as a function of number of pulses of a pulsed laser beam having a wavelength of about 193 nm, a fluence of 600 $\mu J \cdot cm^{-2} \cdot pulse^{-1}$ and a pulse length of approximately 21 ns and a repetition rate of about 4 kHz to which the glass samples G, H, J and K were exposed, and a fluence of 200 $\mu J \cdot cm^{-2} \cdot pulse^{-1}$ and a pulse length of approximately 25 ns and a repetition rate of about 4 kHz to which the glass samples F and L were exposed.

In FIGS. 8 and 13, the horizontal axis represents N(P)·F, where N(P) is the number of pulses in the millions, and F is the fluence of the linearly polarized 193 nm excimer laser pulses in mJ/(cm$^2$·pulse). These figures clearly show, in a totally surprising manner, that the OD-doped samples (Samples C, D, F, G and H) demonstrated much less measured bulk polarization-induced birefringence (PIB(M)) at various N(P)·F. Normalized polarization-induced birefringence values provided in FIGS. 9 and 14 further corroborate the conclusion that OD-doped glass samples have appreciably lower amount of polarization-induced birefringence than glasses doped by OH at comparable levels. Data in these figures clearly show that OD-doped silica glass exhibits superior performance to OH-doped silica glass in terms of polarization-induced birefringence. Even more surprisingly, PIB(M) and PIB(N) data of Sample C measured at over 8 billion pulses shows that the polarization-induced birefringence essentially did not change over those at about 2 and 5 billion pulses, in contrast to the significantly enlarged polarization-induced birefringence value of the OH-doped Samples A and B.

Figure 10:
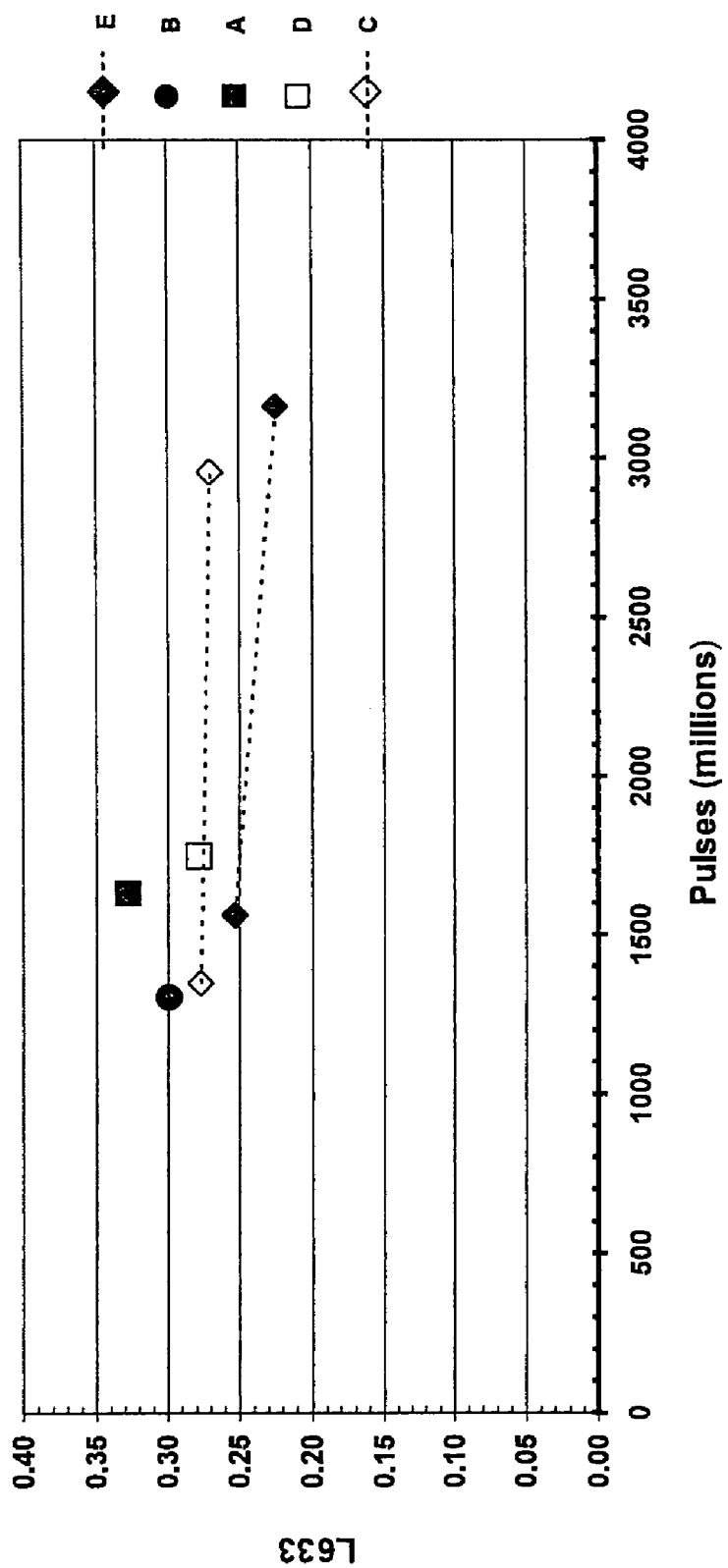
FIG. 10 is a diagram showing normalized LIWFD measured at 633 nm of the same series of OD-doped silica glass samples of the present invention, and the same series of OH-doped silica glass samples as presented in FIG. 8 above, as a function of number of pulses of a pulsed laser beam having a wavelength of about 193 nm, a fluence of about 200 $\mu J \cdot cm^{-2} \cdot pulse^{-1}$ and a pulse length of approximately 25 ns and a repetition rate of about 4 kHz to which the glass samples were exposed.
Figure 11:
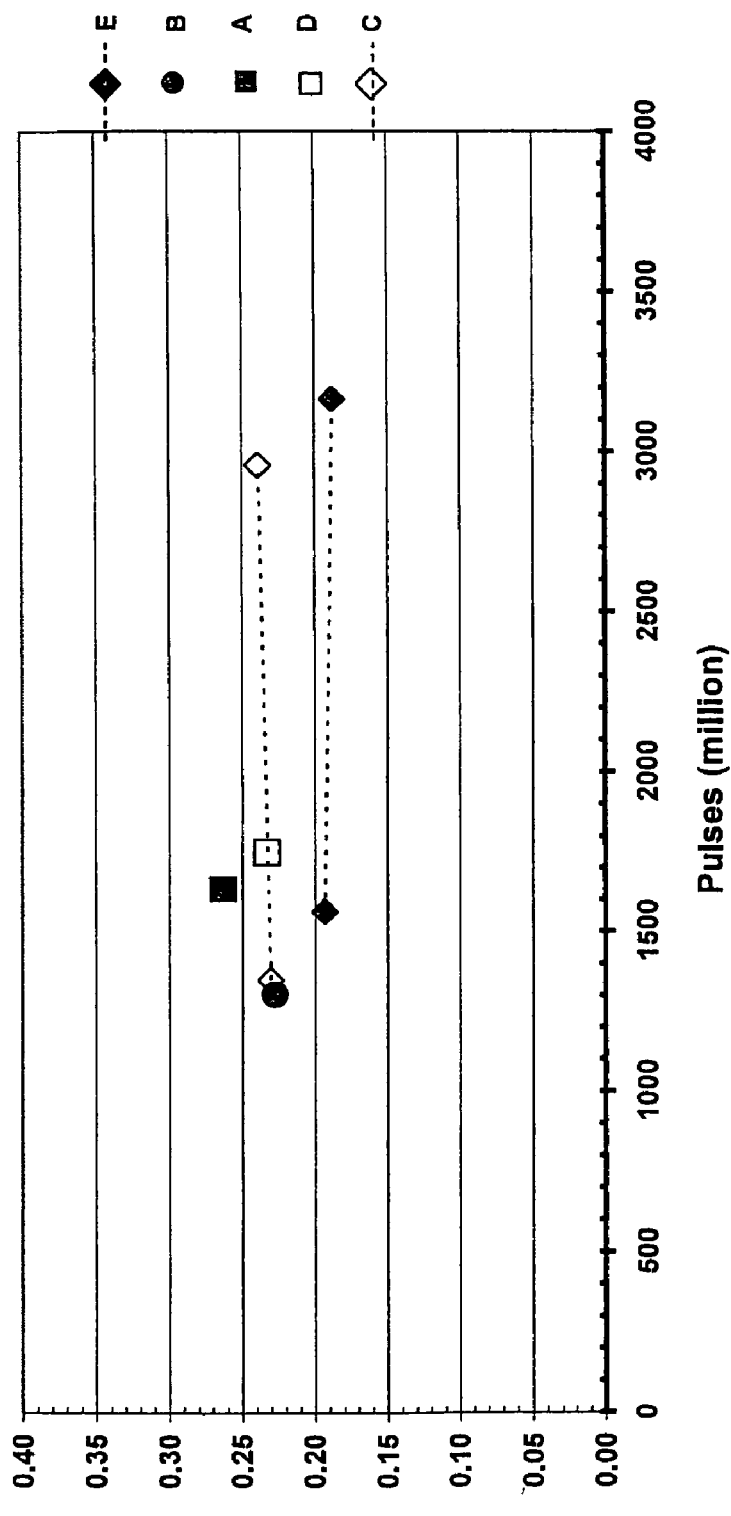
FIG. 11 is a diagram showing normalized LIWFD measured at 193 nm of the same series of OD-doped silica glass samples of the present invention, and the same series of OH-doped silica glass samples as presented in FIG. 8 above, as a function of number of pulses of a pulsed laser beam having a wavelength of about 193 nm, a fluence of about 200 $\mu J \cdot cm^{-2} \cdot pulse^{-1}$ and a pulse length of approximately 25 ns and a repetition rate of about 4 kHz to which the glass samples were exposed.
Figure 15:
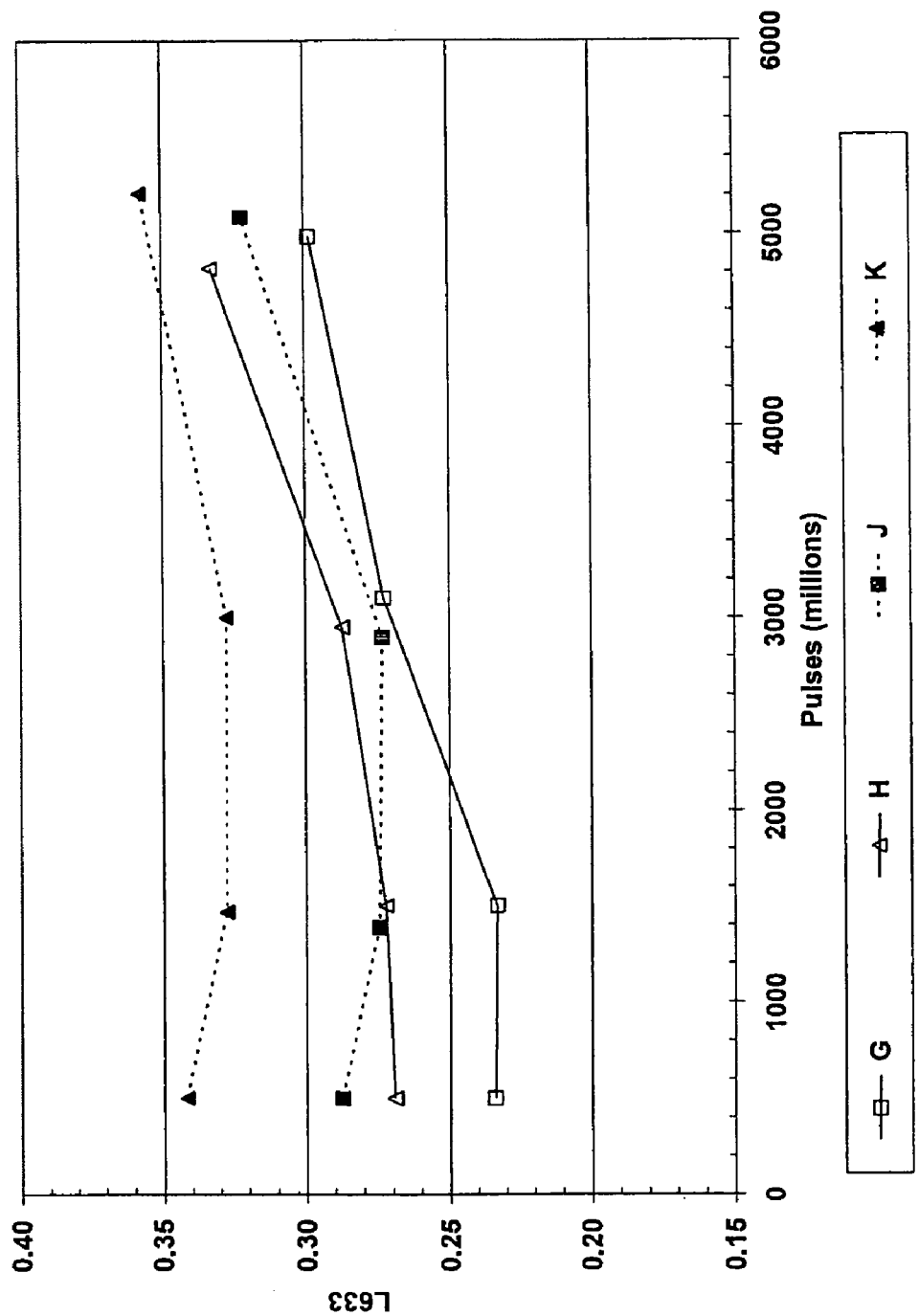
FIG. 15 is a diagram showing normalized LIWFD measured at 633 nm of the same series of OD-doped silica glass samples of the present invention, and the same series of OH-doped silica glass samples G, H, J and K as presented in FIG. 14 above, as a function of number of pulses of a pulsed laser beam having a wavelength of about 193 nm, a fluence of 600 $\mu J \cdot cm^{-2} \cdot pulse^{-1}$ and a pulse length of approximately 21 ns and a repetition rate of about 4 kHz to which the glass samples were exposed.

Normalized LIWFD data of Samples A, B, C, D and E in FIGS. 10, 11 and 15 show that the LIWFD performances of the OD-doped OH-free silica glass is unexpectedly better than that of OH-doped glasses when the concentrations of [OD] and [OH] are comparable. In addition, it was also found that silica glass samples having [OD] at equivalent concentration, but lower fictive temperature ($T_f$) showed lower LIWFD (thus better performance in terms of LIWFD).

As briefly mentioned supra, normalized induced absorption data (IA(N)) shown in FIG. 16 clearly indicate that when exposed to the same dosage of linearly-polarized radiation at 193 nm, the OD-doped silica glasses of the present invention exhibit an appreciably lower level of induced absorption than OH-doped glass with [OH] comparable to the [OD] of the OD-doped glasses of the present invention. This was totally unexpected.

Example 4

In this Example, an OD-doped fused silica glass was made by D/H exchanging OH-doped fused silica glass. The OH-doped fused silica glass used was Corning Incorporated glass code 7980 which was made by using the direct-to-glass process as described U.S. Pat. No. 6,698,248 B2. The glass tested contained approximately 1000 ppm OH and had less than 10 ppb sodium, less than 10 ppb total alkali, less than 10 ppb total alkaline earth elements, and less than 1 ppb iron, chromium or nickel. D/H was accomplished by placing 10 mm×25 mm×200 mm samples in a clean quartz muffle and heating the samples to 900° C. for 30 days in 5.4% $D_2$ in $N_2$ bubbled through 99.9+% $D_2O$ in order to produce an OD-doped fused silica glass containing approximately 1000 ppm by weight of OD, less than 20 ppm by weight of OH and no additional metal contamination.

This example shows that OD-doped silica glass of the present invention can be made by D/H exchange of OH-doped silica glass.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. An OD-doped synthetic silica glass material capable of being used in the light path of the lithographic irradiation of a lithographic device operating at a wavelength below about 300 nm, comprising OD and optionally OH, wherein the ratio of n(OD)/(n(OD)+n(OH)) is higher than $2\times10^{-4}$, and wherein the glass has an internal transmission of at least 99.00%/cm at about 193 nm.

2. A synthetic silica glass material according to claim 1 comprising OD and optionally OH, wherein the ratio of n(OD)/(n(OD)+n(OH)) is higher than 0.05.

3. A synthetic silica glass material according to claim 1, wherein the oxygen atoms in the OD moieties and optionally OH moieties comprise at least one of $^{17}O$ and $^{18}O$ in amounts higher than their respective natural isotopic abundances.

4. A synthetic silica glass material according to claim 1, wherein the ratio of n(OD)/(n(OD)+n(OH)) is higher than 0.95.

5. A synthetic silica glass material according to claim 1, which is a synthetic silica glass further doped with other dopants.

6. A synthetic silica glass material according to claim 1, which is doped with fluorine at an amount between about 1-1000 ppm by weight.

7. A synthetic silica glass material according to claim 1, comprising at least one of $H_2$, HD, $D_2$ and mixtures thereof, wherein the sum total of $[H_2]$, [HD] and $[D_2]$ is between $1\times10^{15}$ to $5\times10^{19}$ molecules/cm$^3$.

8. A synthetic silica glass material according to claim 1, wherein the ratio of $n(D_2)/(n(D_2)+n(H_2))$ or the ratio of $n(H_2)/(n(D_2)+n(H_2))$ is higher than 0.1.

9. A synthetic silica glass material according to claim 1, exhibiting a laser induced wavefront distortion (LIWFD), measured at 633 nm, of between −1.0 and 1.0 nm/cm, when subjected to 10 billion pulses of a laser beam operating at approximately 193 nm and having a fluence of approximately 70 $\mu J \cdot cm^{-2} \cdot pulse^{-1}$ and a pulse length of approximately 25 ns.

10. A synthetic silica glass material according to claim 1 exhibiting a normalized wavefront distortion L633 when subjected to excimer laser pulses at about 193 nm of less than or equal to about 20 billion pulses, measured at about 633 nm, wherein $-1.0 \leq L633 \leq 1.0$.

11. A synthetic silica glass material according to claim 1 exhibiting a normalized wavefront distortion L193 when subjected to excimer laser pulses at about 193 nm of less than or equal to about 20 billion pulses, measured at about 193 nm, wherein $-1.0 \leq L193 \leq 1.0$.

12. A synthetic silica glass material according to claim 1, wherein the OH concentration is lower than about 600 ppm by weight.

13. A synthetic silica glass material according to claim 1, wherein the glass exhibits less than about 1 nm/cm of polarization-induced birefringence measured at about 633 nm after being subjected to $5\times10^9$ pulses of linearly polarized pulsed laser beam at about 193 nm having a fluence of about 40 $\mu J \cdot cm^{-2} \cdot pulse^{-1}$ and a pulse length of about 25 ns.

14. A synthetic silica glass material according to claim 1, wherein the glass exhibits less than about 0.1 nm/cm of polarization-induced birefringence measured at about 633 nm after being subjected to $1\times10^{10}$ pulses of linearly polarized pulsed laser beam at about 193 nm having a fluence of about 40 $\mu J \cdot cm^{-2} \cdot pulse^{-1}$ and a pulse length of about 25 ns.

15. A synthetic silica glass material according to claim 1, wherein the glass exhibits less than about 0.1 nm/cm of polarization-induced birefringence measured at about 633 nm after being subjected to $2\times10^{10}$ pulses of linearly polarized pulsed laser beam at about 193 nm having a fluence of about 40 $\mu J \cdot cm^{-2} \cdot pulse^{-1}$ and a pulse length of about 25 ns.

16. A synthetic silica glass material according to claim 1, wherein the glass exhibits less than about 0.04 nm/cm of polarization-induced birefringence measured at about 633 nm after being subjected to $2\times10^{10}$ pulses of linearly polarized pulsed laser beam at about 193 nm having a fluence of about 40 $\mu J \cdot cm^{-2} \cdot pulse^{-1}$ and a pulse length of about 25 ns.

17. A synthetic silica glass material according to claim 1, wherein the glass exhibits higher than about 0.001 nm/cm of polarization-induced birefringence measured at about 633 nm after being subjected to $2\times10^{10}$ pulses of linearly polarized pulsed laser beam at about 193 um having a fluence of about 40 $\mu J \cdot cm^{-2} \cdot pulse^{-1}$ and a pulse length of about 25 ns.

18. A synthetic silica glass material according to claim 1, wherein the glass exhibits higher than about 0.01 nm/cm of polarization-induced birefringence measured at about 633 nm after being subjected to $2\times10^{10}$ pulses of linearly polarized pulsed laser beam at about 193 nm having a fluence of about 40 $\mu J \cdot cm^{-2} \cdot pulse^{-1}$ and a pulse length of about 25 ns.

19. A synthetic silica glass material according to claim 1, wherein the glass exhibits a polarization-induced birefringence less than about 0.04 nm/cm of polarization-induced birefringence measured at about 633 nm after being subjected to $2\times10^9$ pulses of linearly polarized pulsed laser beam at about 193 nm having a fluence of about 200 $\mu J \cdot cm^{-2} \cdot pulse^{-1}$ and a pulse length of about 25 ns.

20. A synthetic silica glass material according to claim 1, wherein the glass exhibits a normalized polarization-induced birefringence less than 10, when subjected to excimer laser pulses at about 193 nm of less than or equal to about 20 billion pulses.

21. A synthetic silica glass material according to claim 1, wherein the glass exhibits a normalized polarization-induced birefringence less than 2, when subjected to excimer laser pulses at about 193 nm of less than or equal to about 2 billion pulses.

22. A synthetic silica glass material according to claim 1 having an initial internal transmission at about 193 nm of at least 99.65%/cm.

23. A synthetic silica glass material according to claim 1 having a fictive temperature of lower than about 1150° C.

24. A synthetic silica glass material according to claim 1 having a refractive index variation measured in a plane perpendicular to at least one direction of less than about 10 ppm.

25. A synthetic silica glass material according to claim 1 having a concentration variation of OH and OD ([OH]+[OD]) measured in a plane perpendicular to at least one direction of less than about 50 ppm.

26. A synthetic silica glass material according to claim 1 having a Cl concentration less than about 100 ppm.

27. A synthetic silica glass material according to claim 1, wherein the ratio of concentration of OD ([OD]) to the concentration of OH ([OH]) in different locations in the glass, i.e., [OD]/[OH], is essentially constant.

28. A synthetic silica glass material according to claim 1, wherein the ratio of the concentration of $D_2$ ($[D_2]$) to the concentration of $H_2$ ($[H_2]$) in different locations in the glass, i.e., $[D_2]/[H_2]$, is essentially constant.

29. A synthetic silica glass material according to claim 1, comprising less than 50 ppb by weight of sodium.

30. A synthetic silica glass material according to claim 1, comprising less than 50 ppb by weight, of any alkali metal, any alkaline earth metal, and any transition metal.

31. A synthetic silica glass material according to claim 30, comprising less than 50 ppb by weight of all metals in total.

32. An OD-doped synthetic silica glass material according to claim 1 comprising less than about 500 ppm by weight of OH and 0.15-1400 ppm OD.

33. An OD-doped synthetic silica glass material according to claim 1 comprising less than about 150 ppm by weight of OH and about 0.1-1400 ppm OD.

34. An OD-doped synthetic silica glass material according to claim 1 comprising less than about 20 ppm by weight of OH and about 0.01-1400 ppm OD.

35. An OD-doped synthetic silica glass material according to claim 1 comprising less than about 20 ppm by weight OH and between about 0.01-300 ppm OD.

36. An OD-doped synthetic silica glass material according to claim 1 comprising less than about 20 ppm by weight OH and between about 0.01-150 ppm OD.

37. An OD-doped synthetic silica glass material according to claim 1 comprising less than about 1 ppm by weight OH and between about 0.01-150 ppm OD.

38. An optical member for use in the optical path of irradiation having a wavelength shorter than about 300 nm, consisting essentially of a synthetic silica glass material according to claim 1.

39. An optical member according to claim 38, which is a refractive optical member through at least part of which the irradiation having a wavelength shorter than about 300 nm travels.

40. An optical member according to claim 39 selected from the group consisting of prisms, lens elements and photomask substrates for use in or with lithographic devices operating at a wavelength below about 300 nm.

41. A lithographic system comprising at least one optical member according to claim 38.

42. A lithographic system according to claim 41, which is a lithographic system operating at a wavelength of below about 300 nm.

43. A lithographic system according to claim 42, which is an immersion lithographic system.

44. A process for making OD-doped synthetic silica glass material capable of being used in the light path of the lithographic irradiation of a lithographic device operating at a wavelength below about 300 nm, comprising the following steps:
 (I) providing a plurality of particles comprising silica;
 (II) depositing the a plurality of particles on a supportive deposition surface at an elevated temperature such that the particles are consolidated into transparent glass material in situ,
 wherein:
 at least one of the plurality of particles provided in step (I) are D-containing and
 the deposition and consolidation are carried out in step (II) in a D-containing atmosphere,
 such that the obtained silica glass comprises OD and optionally OH, and the ratio of $n(OD)/(n(OD)+n(OH))$ is higher than about $2\times10^{-4}$ and has an internal transmission of at least 99.00%/cm at about 193 nm.

45. A process according to claim 44, wherein the obtained silica glass comprise sodium less than about 50 ppb by weight.

46. A process according to claim 44, wherein in step (I), the particles are generated by flame hydrolysis of at least one Si-containing precursor compound.

47. A process according to claim 46, wherein in step (I), the Si-containing precursor compound is selected from organo-silicon compounds and silicon halides.

48. A process according to claim 44, wherein in step (II), the deposition is initiated on an essentially planar top surface of a horizontally rotating table.

49. A process according to claim 44, wherein in step (II), the deposition and consolidation are carried out in the presence of $D_2O$.

50. A process according to claim 44, wherein in step (II), the deposition and consolidation are carried out in the presence of $H_2O$.

51. A process according to claim 50, wherein the Si-containing precursor compound comprises D.

52. A process according to claim 46, wherein the flame is generated by at least one reaction involving a D-containing compound.

53. A process according to claim 44, wherein in step (I), the particles are provided via a soot dispenser.

54. A process according to claim 44, wherein in step (I), the particles are provided via a plasma-assisted process.

55. A process according to claim 44, further comprising the following step:
 (III) treating the consolidated glass obtained in step (II) in an atmosphere comprising at least one of $H_2$, HD, and $D_2$.

56. A process according to claim 55, wherein in step (III), the treatment temperature is lower than about 600° C.

57. A process according to claim 55, wherein in step (III), the treatment temperature is higher than about 600° C.

58. A process according to claim 55, wherein in step (III), the ratio of $(2n(H_2)+n(HD))/2(n(H_2)+n(D_2)+n(HD))$ is higher than or equal to the natural abundance of H.

59. A process according to claim 55, wherein in step (III), the ratio of $(2n(D_2)+n(HD))/2(n(H_2)+n(D_2)+n(HD))$ is higher than or equal to the natural abundance of D.

60. A process according to claim 55, wherein in step (III), the treatment time and temperature is chosen such that the sum total of the concentration of $H_2$, HD and $D_2$ in the treated glass is between about $0.1\times10^{16}$ to about $5\times10^{19}$ molecules/cm$^3$.

61. A process according to claim 55, wherein in step (I), particles comprising dopants are provided and mixed with the particles comprising silica.

62. A process according to claim 61, wherein the particles comprising dopants comprise at least one of Cl, $TiO_2$, F and $Al_2O_3$.

63. A process according to claim 62, wherein the particles comprising dopants comprise fluorine.

64. A process for making OD-doped synthetic silica glass material capable of being used in the light path of the lithographic irradiation of a lithographic device operating at a wavelength below about 300 nm, comprising the following steps:
 (A) providing a particle preform comprising a plurality of particles comprising silica;
 (B) optionally purifying or drying the particle preform;
 (C) optionally further doping the particle preform with dopants;
 (D) consolidating the particle preform at an elevated temperature to dense glass; and
 (E) optionally treating the consolidated glass obtained in step (D) in the presence of at least one of $H_2$, HD, and $D_2$,
 wherein in at least one of steps (A), (B), (C), (D) and (E), OD is introduced into or formed in the glass such that obtained silica glass comprises OD and optionally OH, and the ratio of $n(OD)/(n(OD)+n(OH))$ is higher than about $2\times10^{-4}$, and wherein the glass has an internal transmission of at least 99.00%/cm at about 193 nm.

65. A process according to claim 64, wherein the obtained silica glass comprises less than about 50 ppb by weight of sodium.

66. A process according to claim 65, wherein the soot preform provided in step (A) comprises sodium lower than about 50 ppb by weight.

67. A process according to claim 64, wherein:
the soot preform provided in step (A) comprises sodium higher than about 50 ppb by weight;
step (B) is carried out subsequent to step (A); and
upon completion of step (B), the soot preform comprises sodium less than about 50 ppb by weight.

68. A process according to claim 64, wherein in at least one of steps (A), (B), (C) and (D), OD is introduced into or formed in the glass.

69. A process according to claim 64, wherein step (A) comprises the following steps:
(A1) providing a plurality of particles; and
(A2) depositing the particles on a rotating supporting surface to form the particle preform.

70. A process according to claim 69, wherein in step (A1), the particles are provided by (A1.1) flame hydrolysis of at least one silicon-containing precursor compound, which may be plasma-assisted; or (A1.2) a soot dispenser, which may be plasma assisted; or (A1.3) other plasma-assisted process.

71. A process according to claim 70, wherein in step (A1), the particles are provided by (A1.1), and the particles are essentially not OD-doped.

72. A process according to claim 70, wherein in step (A1), the particles are provided by (A1.1), and the particles provided are OD-doped.

73. A process according to claim 72, wherein in step (A1), the particles are provided by flame hydrolysis in the presence of a D-containing compound.

74. A process according to claim 73, wherein in step (A1), the particles are provided by flame hydrolysis in the presence of $D_2O$.

75. A process according to claim 69, wherein in step (A2), the deposition involves a process selected from (A2.1) outside vapor deposition; (A2.2) inside vapor deposition; (A2.3) vapor axial deposition; and (A2.4) planar deposition.

76. A process according to claim 64, wherein step (A) comprises the following steps:
(A(i)) forming a sol-gel comprising silica; and
(A(ii)) forming the particle preform from the sol-gel.

77. A process according to claim 76, wherein step (A(i)) is carried out in the presence of or from a D-containing compound.

78. A process according to claim 77, wherein step (A(i)) is carried out in the presence of $D_2O$.

79. A process according to claim 64, wherein step (B) is carried out and such step is carried out in an atmosphere comprising at least one purifying/drying agent selected from $F_2$, $Cl_2$, $Br_2$, a halogen-containing compound, CO, $CO_2$, and compatible mixtures thereof.

80. A process according to claim 79, wherein the halogen-containing compound is selected from HX, $COX_2$, $SOX_2$, $CX_4$ and $SX_6$, wherein X is selected from F, Cl, Br and combinations thereof.

81. A process according to claim 79, wherein step (B) is carried out in an atmosphere comprising $Cl_2$, $Br_2$ or mixtures thereof, with or without containing CO.

82. A process according to claim 79, wherein immediately after step (B), the particle preform has an [OH]+[OD] less than about 50 ppm by weight of the total composition.

83. A process according to claim 64, wherein step (C) is carried out, and such step is carried out in the presence of an atmosphere comprising dopant(s).

84. A process according to claim 83, wherein step (C) is carried out in the presence of a D-containing compound.

85. A process according to claim 83, wherein step (C) is carried out in the presence of $D_2O$, $D_2$ or both.

86. A process according to claim 84, wherein in step (C) exchange of OD for OH is carried out.

87. A process according to claim 86, wherein immediately after step (C), the ratio of n(OD)/(n(OD)+n(OH)) in the particle preform is higher than about 0.02.

88. A process according to claim 64, if step (B) or step (C) is carried out, at least one of these two steps is carried out in the presence of a reductive atmosphere.

89. A process according to claim 88, wherein in the reductive atmosphere in which step (B) or step (C) is carried out comprises a gas selected from $H_2$, $D_2$, HD, hydrocarbons, D-containing hydrocarbons, and the like.

90. A process according to claim 88, wherein after step (B) or step (C), if carried out, and whichever is later, an oxidation step (C(A)) is carried out wherein the particle preform is subjected to an oxidative atmosphere in which oxygen-deficient sites in the particle preform can be healed.

91. A process according to claim 90, wherein step (C(A)) is at least part of step (D).

92. A process according to claim 90, wherein the oxidative atmosphere in step (C(A)) comprises at least one of $H_2O$, $D_2O$, $O_2$, and $O_3$.

93. A process according to claim 64, wherein steps (B) and (C) are carried out at least partially simultaneously.

94. A process according to claim 64, wherein steps (C) and (D) are carried out at least partially simultaneously.

95. A process according to claim 64, wherein step (D) is carried out in an atmosphere comprising He.

96. A process according to claim 65, wherein step (D) is carried out in an atmosphere comprising $O_2$.

97. A process according to claim 64, wherein step (D) is carried out in the presence of $H_2O$.

98. A process according to claim 64, wherein step (D) is carried out in the presence of $D_2O$.

99. A process according to claim 98, wherein step (D) is carried out in an atmosphere essentially free of $H_2O$ and HDO.

100. A process according to claim 64, wherein step (D) is carried out in the presence of $D_2$, HD or both.

101. A process according to claim 64, wherein step (E) is carried out, and such step (E) is carried out in the presence of $H_2$.

102. A process according to claim 101, wherein step (E) is carried out in an atmosphere essentially devoid of $D_2$ and HD.

103. A process according to claim 102, wherein step (E) is carried out at a temperature lower than about 600° C.

104. A process according to claim 100, wherein step (E) is carried out at a temperature below about 1000° C.

105. A process according to claim 64, wherein step (E) is carried out, and such step (E) is carried out in the presence of at least one of $D_2$ and HD.

106. A process according to claim 105, wherein step (E) is carried out in an atmosphere essentially devoid of $H_2$.

107. A process according to claim 106, wherein step (E) is carried out in an atmosphere essentially devoid of HD and $H_2$.

108. A process according to claim 105, wherein step (E) is carried out at a temperature higher than about 600° C.

109. A process according to claim 64, wherein:
the dense glass resulting from step (D) comprises OH;
step (E) is carried out; and
in step (E), the glass is treated in an atmosphere comprising at least one of $D_2$, HD, and $H_2$ to effect H/D exchange in the dense glass to obtain the desired [OH] and [OD] in the glass.

110. A process according to claim 109, wherein:
the dense glass resulting from step (D) is essentially not OD-doped; and in step (E), the glass is treated in an atmosphere comprising $D_2$ to effect H/D exchange in the dense glass to obtain the desired [OH] and [OD] in the glass.

111. A process according to claim 110, wherein:
in step (E), the glass is treated in an atmosphere comprising $D_2$ to effect H/D exchange such that at the end of the step (E), the glass has a ratio of n(OD)/(n(OD)+n(OH)) of at least 0.5.

112. A process according to claim 111, wherein:
at the end of step (E), the glass has a ratio of n(OD)/(n(OD)+n(OH)) of at least 0.9.

113. A process according to claim 109, wherein step (E) is carried out at a temperature of at least 600° C.

114. A process according to claim 113, wherein step (E) is carried out at a temperature of at least 800° C.

115. A process for making OD-doped synthetic silica glass capable of being used in the light path of the lithographic irradiation of a lithographic device operating at a wavelength below about 300 nm, comprising the following steps:
   (a) providing a plurality of OD-doped particles comprising silica; and
   (b) melting the particles at an elevated temperature to obtain a transparent glass, wherein the ratio of n(OD)/(n(OD)+n(OH)) is higher than $2 \times 10^{-4}$, and wherein the glass has an internal transmission of at least 99.00%/cm at about 193 nm.

116. A process according to claim 115, wherein step (a) comprise the following steps:
   (a1) generating a plurality of particles comprising silica;
   (a2) optionally, at least one of purifying and drying the particles; (a3) optionally doping the particles in an atmosphere comprising at least one D-containing compound, and
   (a4) optionally treating the particles in an oxidative atmosphere to at least partly heal oxygen-deficient sites in the particles.

117. A process according to claim 116, wherein in step (a3), the at least one D-containing compound comprises $D_2O$.

118. A process according to claim 115, wherein step (a) involves flame hydrolysis of a Si-containing precursor compound.

119. A process according to claim 115, wherein step (a) involves a sol-gel process of a Si-containing compound.

120. A process according to claim 115, wherein in step (b), the melted glass is also homogenized.

121. A process according to claim 115, further comprising the following step (c) after step (b):
   (c) treating the glass in an atmosphere comprising at least one of $H_2$, $D_2$, and HD.

122. A process for making OD-doped synthetic silica glass capable of being used in the light path of the lithographic irradiation of a lithographic device operating at a wavelength below about 300 nm, comprising the following steps:
   (a) providing at least one consolidated OD-doped silica glass;
   (b) melting the OD-doped silica glass and homogenizing it at an elevated temperature to obtain a glass having at least one of [OD] and [OH] essentially uniformly distributed therein, wherein the ratio of n(OD)/(n(OD)+n(OH)) is higher than $2 \times 10^{-4}$, and wherein the glass has an internal transmission of at least 99.00%/cm at about 193 nm.

123. A process according to claim 122, wherein:
in step (a), at least two OD-doped silica glasses having differing [OD] are provided; and
in step (b), the at least two silica glasses are mixed and homogenized.

124. A process for making OD-doped synthetic silica glass capable of being used in the light path of the lithographic irradiation of a lithographic device operating at a wavelength below about 300 nm, comprising the following steps:
   (a) providing a consolidated silica glass comprising OH;
   (b) treating the consolidated glass in an atmosphere comprising at least one of $D_2$, $H_2$, and HD to effect H/D exchange to the desired [OH] and [OD] in the glass, wherein the ratio of n(OD)/(n(OD)+n(OH)) is higher than $2 \times 10^{-4}$, and wherein the glass has an internal transmission of at least 99.00%/cm at about 193 nm.

125. A process according to claim 124, wherein:
the dense glass provided in step (a) is essentially not OD-doped; and
in step (b), the glass is treated in an atmosphere comprising $D_2$ to effect H/D exchange in the dense glass to obtain the desired [OH] and [OD] in the glass.

126. A process according to claim 125, wherein:
in step (b), the glass is treated in an atmosphere comprising $D_2$ to effect H/D exchange such that at the end of the step (b), the glass has a ratio of n(OD)/(n(OD)+n(OH)) of at least 0.5.

127. A process according to claim 126, wherein:
at the end of step (b), the glass has a ratio of n(OD)/(n(OD)+n(OH)) of at least 0.9.

128. A process according to claim 124, wherein step (b) is carried out at a temperature of at least 600° C.

129. A process according to claim 128, wherein step (b) is carried out at a temperature of at least 800° C.

130. An OD-doped synthetic silica glass material capable of being used in the light path of the lithographic irradiation of a lithographic device operating at a wavelength below about 300 nm, comprising OD and optionally OH, wherein the ratio of n(OD)/(n(OD)+n(OH)) is higher than $2 \times 10^{-4}$, and wherein the glass has an internal transmission of at least 99.00%/cm at about 248 nm.

* * * * *

UNITED STATES PATENT AND TRADEMARK OFFICE
CERTIFICATE OF CORRECTION

| | | |
|---|---|---|
| PATENT NO. | : 7,635,658 B2 | Page 1 of 1 |
| APPLICATION NO. | : 11/583619 | |
| DATED | : December 22, 2009 | |
| INVENTOR(S) | : Dana Craig Bookbinder et al. | |

It is certified that error appears in the above-identified patent and that said Letters Patent is hereby corrected as shown below:

Title Page,

Insert Item -- (73) Assignee: Corning Incorporated, Corning, NY US --

Signed and Sealed this

Second Day of August, 2011

David J. Kappos
*Director of the United States Patent and Trademark Office*